(12) United States Patent
Jones-McFadden et al.

(10) Patent No.: US 10,158,535 B2
(45) Date of Patent: Dec. 18, 2018

(54) SYSTEM FOR ACTIVE CONFIGURATION OF DEVICES BASED ON USER SELECTION

(71) Applicant: BANK OF AMERICA CORPORATION, Charlotte, NC (US)

(72) Inventors: Alicia C. Jones-McFadden, Fort Mill, SC (US); Caitlin Chrisman Bullock, Durham, NC (US); Matthew Hsieh, Charlotte, NC (US); Jaydev Ajit Kumar, Los Angeles, CA (US); Yaakov Lyubetsky, Lexington, MA (US); Yun Suk Paik, Oakton, VA (US); Heng Xu, Sunnyvale, CA (US); Jimin Zheng, Hacienda Heights, CA (US)

(73) Assignee: Bank of America Corporation, Charlotte, NC (US)

( * ) Notice: Subject to any disclaimer, the term of this patent is extended or adjusted under 35 U.S.C. 154(b) by 317 days.

(21) Appl. No.: 14/928,506

(22) Filed: Oct. 30, 2015

(65) Prior Publication Data
US 2017/0126510 A1 May 4, 2017

(51) Int. Cl.
| | |
|---|---|
| *G06F 3/048* | (2013.01) |
| *H04L 12/24* | (2006.01) |
| *G06F 3/0484* | (2013.01) |
| *H04L 29/08* | (2006.01) |
| *G06F 3/0482* | (2013.01) |
| *H04L 29/06* | (2006.01) |

(52) U.S. Cl.
CPC ............ *H04L 41/22* (2013.01); *G06F 3/0482* (2013.01); *G06F 3/04842* (2013.01); *H04L 41/0823* (2013.01); *H04L 63/08* (2013.01); *H04L 63/105* (2013.01); *H04L 67/141* (2013.01)

(58) Field of Classification Search
CPC ............................ G06F 3/048; H04L 41/0823
See application file for complete search history.

(56) References Cited

U.S. PATENT DOCUMENTS

| | | |
|---|---|---|
| 5,644,727 A | 7/1997 | Atkins |
| D484,183 S | 12/2003 | Majima |
| (Continued) | | |

OTHER PUBLICATIONS

"Financial Security Planning Service—Our Services," http://www.financialsecurityplanning.com/ourservices.aspx on Aug. 30, 2012.

(Continued)

*Primary Examiner* — Xuyang Xia
(74) *Attorney, Agent, or Firm* — Michael A. Springs; Moore & Van Allen PLLC; Anup Shrinivasan

(57) ABSTRACT

Systems, computer program products, and methods are described herein for active management of devices based on user selection. The present invention is configured to initiate a control interface, wherein the control interface comprises one or more features associated with the one or more devices; receive a user selection of at least one of the one or more features associated with the one or more devices, thereby allowing one or more control factors associated with the one or more features to be modified; determine an optimum value for the one or more selected features, wherein the optimum value aids the user in accomplishing the selected target; and modify a value associated with the one or more selected features to reflect the optimum value.

20 Claims, 22 Drawing Sheets

(56) References Cited

U.S. PATENT DOCUMENTS

| | | | |
|---|---|---|---|
| 6,819,341 B2 | 11/2004 | Dow et al. |
| 7,318,049 B2 | 1/2008 | Iannacci |
| 7,526,539 B1 | 4/2009 | Hsu |
| 7,587,363 B2 | 9/2009 | Cataline et al. |
| 7,630,937 B1 | 12/2009 | Mo et al. |
| 7,865,419 B2 | 1/2011 | Rojeck et al. |
| 7,890,422 B1 | 2/2011 | Hirka et al. |
| 7,895,102 B1 | 2/2011 | Wilks et al. |
| 7,899,750 B1 | 3/2011 | Klieman et al. |
| 8,024,213 B1 | 9/2011 | Fano et al. |
| 8,190,508 B1 | 5/2012 | Sack |
| D667,450 S | 9/2012 | Eby et al. |
| 8,260,725 B2 | 9/2012 | Crawford |
| 8,335,728 B1 | 12/2012 | Dahodwala et al. |
| 8,340,635 B2 | 12/2012 | Herz et al. |
| 8,457,619 B2 | 6/2013 | Macaluso |
| 8,484,636 B2 | 7/2013 | Mehta et al. |
| 8,554,376 B1* | 10/2013 | Matsuoka | H04L 12/2825 |
| | | | 236/46 R |
| 8,606,599 B1 | 12/2013 | Wong et al. |
| 8,635,132 B1 | 1/2014 | Wilks et al. |
| 8,787,947 B2 | 7/2014 | Backholm et al. |
| 8,813,060 B2 | 8/2014 | Tewari et al. |
| 8,825,663 B2 | 9/2014 | Mahaniok et al. |
| D715,322 S | 10/2014 | Sakata |
| 8,862,105 B2 | 10/2014 | Lindeman et al. |
| 8,984,628 B2 | 3/2015 | Mahaffey et al. |
| 8,990,183 B2 | 3/2015 | Liu et al. |
| 9,026,479 B1 | 5/2015 | Baluja et al. |
| 9,047,636 B2 | 6/2015 | Ross |
| 9,063,811 B2 | 6/2015 | Stekkelpak et al. |
| 9,075,508 B1 | 7/2015 | Cronin |
| 9,092,473 B2 | 7/2015 | Huang et al. |
| 9,113,286 B1 | 8/2015 | Adams et al. |
| D741,901 S | 10/2015 | Gardner et al. |
| D745,045 S | 12/2015 | Heeter et al. |
| D753,148 S | 4/2016 | Kim |
| D753,703 S | 4/2016 | Villamor et al. |
| D762,671 S | 8/2016 | Chan et al. |
| D769,261 S | 10/2016 | Gomez |
| D776,692 S | 1/2017 | Armstrong |
| D789,389 S | 6/2017 | Kim et al. |
| 2004/0186770 A1 | 9/2004 | Pettit et al. |
| 2004/0193686 A1 | 9/2004 | Blagsvedt et al. |
| 2005/0027632 A1 | 2/2005 | Zeitoun et al. |
| 2005/0101312 A1 | 5/2005 | Kang |
| 2006/0085790 A1 | 4/2006 | Hintermeister et al. |
| 2006/0174127 A1 | 8/2006 | Kalavade et al. |
| 2007/0005498 A1 | 1/2007 | Cataline et al. |
| 2007/0117616 A1 | 5/2007 | Bartholomew |
| 2007/0162387 A1 | 7/2007 | Cataline et al. |
| 2007/0264991 A1 | 11/2007 | Jones et al. |
| 2007/0268392 A1 | 11/2007 | Paalasmaa et al. |
| 2007/0294293 A1 | 12/2007 | Rosenbloom et al. |
| 2009/0119204 A1 | 5/2009 | Akella et al. |
| 2009/0144166 A1 | 6/2009 | Dickelman |
| 2009/0171691 A1 | 7/2009 | Lubarski et al. |
| 2009/0265241 A1 | 10/2009 | Bishop et al. |
| 2010/0023865 A1 | 1/2010 | Fulker et al. |
| 2010/0082445 A1 | 4/2010 | Hodge et al. |
| 2010/0138007 A1 | 6/2010 | Clark et al. |
| 2010/0241559 A1 | 9/2010 | O'Connor et al. |
| 2010/0268629 A1 | 10/2010 | Ross et al. |
| 2010/0280935 A1 | 11/2010 | Fellowes et al. |
| 2010/0288834 A1 | 11/2010 | Tichelaer et al. |
| 2010/0299195 A1 | 11/2010 | Nix et al. |
| 2011/0131106 A1 | 6/2011 | Eberstadt et al. |
| 2011/0275391 A1 | 11/2011 | Lee et al. |
| 2011/0296339 A1 | 12/2011 | Kang |
| 2011/0302517 A1* | 12/2011 | Duchene | G08C 17/02 |
| | | | 715/771 |
| 2012/0124112 A1 | 5/2012 | Goldhaber |
| 2012/0125559 A1* | 5/2012 | Fadell | F24F 11/0012 |
| | | | 165/11.2 |
| 2012/0130513 A1* | 5/2012 | Hao | G05B 15/02 |
| | | | 700/90 |
| 2012/0130886 A1 | 5/2012 | Shergill et al. |
| 2012/0296768 A1 | 11/2012 | Fremont-Smith et al. |
| 2012/0299710 A1 | 11/2012 | Karaoguz et al. |
| 2013/0013119 A1 | 1/2013 | Mansfield et al. |
| 2013/0046702 A1 | 2/2013 | Ross et al. |
| 2013/0052946 A1 | 2/2013 | Chatterjee et al. |
| 2013/0173344 A1 | 7/2013 | Kundagrami et al. |
| 2013/0346133 A1 | 12/2013 | Soliman et al. |
| 2014/0067634 A1 | 3/2014 | Sowder et al. |
| 2014/0067712 A1 | 3/2014 | Prasad et al. |
| 2014/0245156 A1 | 8/2014 | Roos |
| 2014/0325410 A1 | 10/2014 | Jung et al. |
| 2014/0337791 A1 | 11/2014 | Agnetta et al. |
| 2015/0026055 A1 | 1/2015 | Calman et al. |
| 2015/0064671 A1 | 3/2015 | Murville et al. |
| 2015/0081450 A1 | 3/2015 | Bean |
| 2015/0201317 A1 | 7/2015 | Kuusilinna et al. |
| 2015/0215491 A1 | 7/2015 | Faust |
| 2015/0220923 A1 | 8/2015 | Vasant Akole et al. |
| 2015/0242091 A1 | 8/2015 | Lu et al. |
| 2015/0261415 A1 | 9/2015 | Lee et al. |
| 2015/0350874 A1 | 12/2015 | Draznin et al. |
| 2016/0173578 A1 | 6/2016 | Sharma et al. |
| 2016/0267518 A1 | 9/2016 | Glover et al. |
| 2016/0328667 A1 | 11/2016 | Macciola et al. |
| 2016/0360039 A1 | 12/2016 | Sanghavi et al. |
| 2017/0032356 A1 | 2/2017 | Deshpande |
| 2017/0070361 A1 | 3/2017 | Sundermeyer et al. |
| 2017/0126509 A1 | 5/2017 | Jones-Mcfadden et al. |

OTHER PUBLICATIONS

"Simple Collaborative Budgeting—BudgetSketch—Pricing," downloaded fro, https://www.budgetsketch.com/pricing on Aug. 30, 2012.
Goal setting, Goal tracking, goal worksheet, SMART Goals, to do list, set goals online: downloaded from http://www.getgoaling.com/ on Aug. 30, 2012.
"Set Financial Goals, Track and Grow Funds with Budget Pulse Financial Planner," downloaded from https://www.budgetpulse.com/pages/saving_goals on Aug. 30, 2012.
"Revolutionary Saving & Investing for Bank of America," goalmineTM, an MPOWER Venture Company, Gratio Capital, Inc., 2009, 30 pages.
Hong Joo Lee, Joon Yeon Choi, and Sung Joo Park; "Context-Aware Recommendations on the Mobile Web"; downloaded from http://www.researchgate.net on Aug. 14, 2015.
STIC Search Report EIC3600 for U.S. Appl. No. 13/035,807 dated Jul. 11, 2014.
PCT Search Report and Written Opinion for International Application No. PCT/US 12/26516 dated May 23, 2012.

* cited by examiner

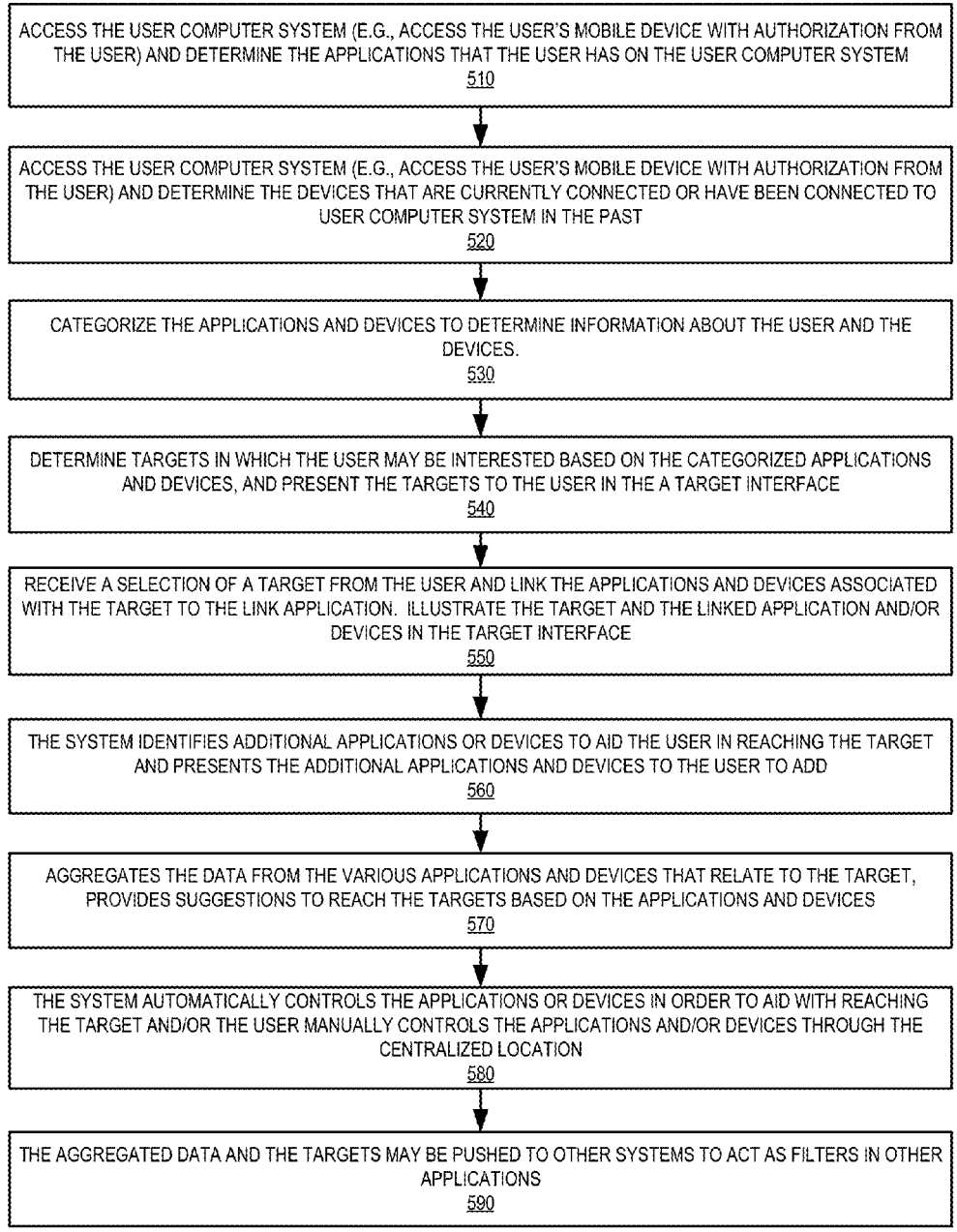

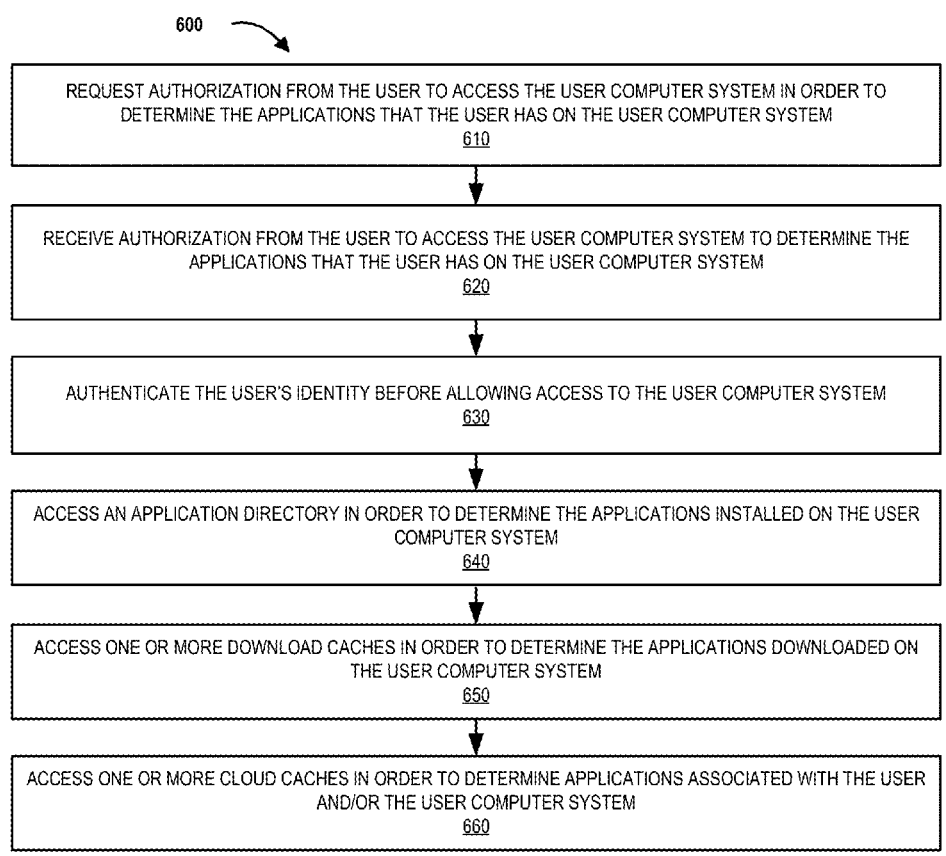

SYSTEM FOR ACTIVE CONFIGURATION OF DEVICES BASED ON USER SELECTION

FIELD

The present invention relates to utilizing centralized control of applications and devices of a user in order to achieve desired targets of the user.

BACKGROUND

Achieving targets of a user may be based on a number of applications and/or devices that operate independently from each other. However, these disparate applications and/or devices may all contribute to related targets of a user. Typically, a user is required to take information from these applications and/or devices in order to determine what targets a user would like to accomplish and how the user is achieving the user targets. As such, there is a need to improve how a user determines targets in which the user is interested and how to monitor the applications and/or devices in order to reach the targets.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Generally, systems, computer program products, and methods are described herein for determining the applications and/or devices that a user users, or has used in the past; categorizing the applications and/or devices related to one or more potential targets in which the user maybe interested; providing the one or more potential targets to the user in a target interface; receiving a selection from the user of one or more active targets to pursue; providing suggested applications and/or devices that the user may want to utilize in order to help achieve the one or more active targets; the system monitors and aggregates information from the applications and devices related to the one or more active targets and provides suggestions to aid in achieving the targets; control of the applications and/or devices related to the one or more active targets is controllable by the user in a central location; the system may automatically control the applications and/or devices related to the one or more active targets in order to aid in achieving the one or more active targets; and the aggregated information and/or one or more targets may be pushed to other systems to act as filters or additional information for other systems or applications to provide goods and/or services (e.g., products) or better identify products to present to the user.

In one aspect, a system for active management of devices based on user selection is presented. The system comprises at least one non-transitory storage device; at least one processor; and at least one module stored in said storage device and comprising instruction code that is executable by the at least one processor and configured to cause said at least one processor to: establish a communication link with a user device, wherein the establishing further comprises establishing a data channel to access a user device; access the user device via the established data channel, wherein accessing further comprises determining a plurality applications stored on the user device; determine a plurality of devices associated with the user based at least in part on the plurality of applications; initiate, via the established communication link, a presentation of a target interface, wherein the target interface comprises one or more target categories and one or more targets associated with the one or more target categories determined based on at least the plurality of devices and the plurality of applications; receive, via the target interface, a user selection of a target category and a target associated with the target category; initiate, via the established communication link, a control interface, wherein the control interface comprises one or more features associated with the plurality of devices; receive, via the control interface, a user selection of at least one of the one or more features associated with the plurality of devices, thereby allowing one or more control factors associated with the one or more features to be modified; determine an optimum value for the one or more selected features, wherein applying the optimum value to the one or more selected features aids the user in accomplishing the selected target; and modify a value associated with the one or more selected features to reflect the optimum value.

In some embodiments, the plurality of devices are currently connected to a user device and/or the plurality of applications are currently stored on the user device.

In some embodiments, the plurality of devices and/or the plurality of applications have been connected to the user device in the past.

In some embodiments, the module is further configured to cause the at least one processor to: execute a simulation by varying one or more values of the one or more features relative to the selected target, wherein executing further comprises determining an impact value associated with the selected target, wherein the impact value indicates a likelihood of the user accomplishing the target; and determine an optimum value for the one or more features based on at least the impact value.

In some embodiments, the module is further configured to cause the at least one processor to: initiate a presentation of an authentication interface in response to determining the plurality of devices associated with the user and the plurality of applications stored on the user device; receive, via the authentication interface, one or more authentication credentials from the user; validate the one or more authentication credentials; and access the plurality of devices associated with the user and/or the plurality of applications stored on the user device, wherein accessing further comprises modifying at least one control factor associated with the plurality of devices via the plurality of applications stored on the user device.

In some embodiments, the module is further configured to cause the at least one processor to: determine one or more additional devices and/or one or more additional applications associated with the user based on at least determining that the one or more additional devices when combined with the plurality of devices aids the user to accomplish the target.

In some embodiments, the one or more additional devices are not currently connected to a user device and/or the one or more additional applications are not currently stored on the user device.

In some embodiments, the one or more additional devices and/or the one or more additional applications have not been connected to the user device in the past.

In another aspect, a method for active management of devices based on user selection is presented. The method comprises establishing, using a computing device processor, a communication link with a user device, wherein the establishing further comprises establishing a data channel to access a user device; accessing, using a computing device processor, the user device via the established data channel, wherein accessing further comprises determining a plurality applications stored on the user device; determining, using a computing device processor, a plurality of devices associated with the user based at least in part on the plurality of applications; initiating, via the established communication link, a presentation of a target interface, wherein the target interface comprises one or more target categories and one or more targets associated with the one or more target categories determined based on at least the plurality of devices and the plurality of applications; receiving, via the target interface, a user selection of a target category and a target associated with the target category; initiating, via the established communication link, a control interface, wherein the control interface comprises one or more features associated with the plurality of devices; receiving, via the control interface, a user selection of at least one of the one or more features associated with the plurality of devices, thereby allowing one or more control factors associated with the one or more features to be modified; determining, using a computing device processor, an optimum value for the one or more selected features, wherein applying the optimum value to the one or more selected features aids the user in accomplishing the selected target; and modifying, using a computing device processor, a value associated with the one or more selected features to reflect the optimum value.

In yet another aspect, a computer program product for active management of devices based on user selection is presented. The computer program product comprises a non-transitory computer-readable medium comprising code causing a first apparatus to: establish a communication link with a user device, wherein the establishing further comprises establishing a data channel to access a user device; access the user device via the established data channel, wherein accessing further comprises determining a plurality applications stored on the user device; determine a plurality of devices associated with the user based at least in part on the plurality of applications; initiate, via the established communication link, a presentation of a target interface, wherein the target interface comprises one or more target categories and one or more targets associated with the one or more target categories determined based on at least the plurality of devices and the plurality of applications; receive, via the target interface, a user selection of a target category and a target associated with the target category; initiate, via the established communication link, a control interface, wherein the control interface comprises one or more features associated with the plurality of devices; receive, via the control interface, a user selection of at least one of the one or more features associated with the plurality of devices, thereby allowing one or more control factors associated with the one or more features to be modified; determine an optimum value for the one or more selected features, wherein applying the optimum value to the one or more selected features aids the user in accomplishing the selected target; and modify a value associated with the one or more selected features to reflect the optimum value.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
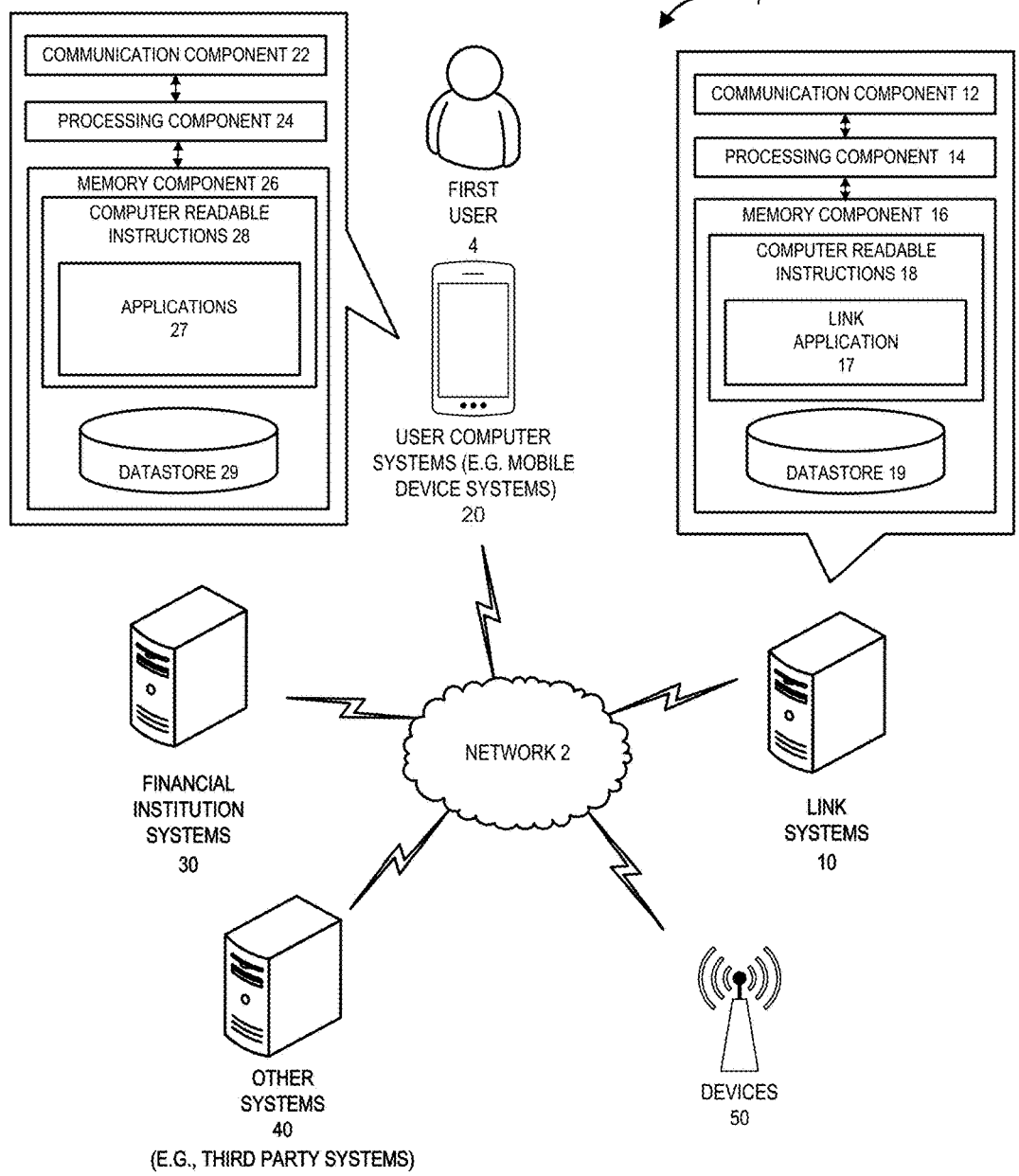

Having thus described embodiments of the invention in general terms, reference will now be made to the accompanying drawings, which are not necessarily drawn to scale, and wherein:

FIG. 1 illustrates a block diagram of a linked system environment, in accordance with embodiments of the invention.

Figure 2:
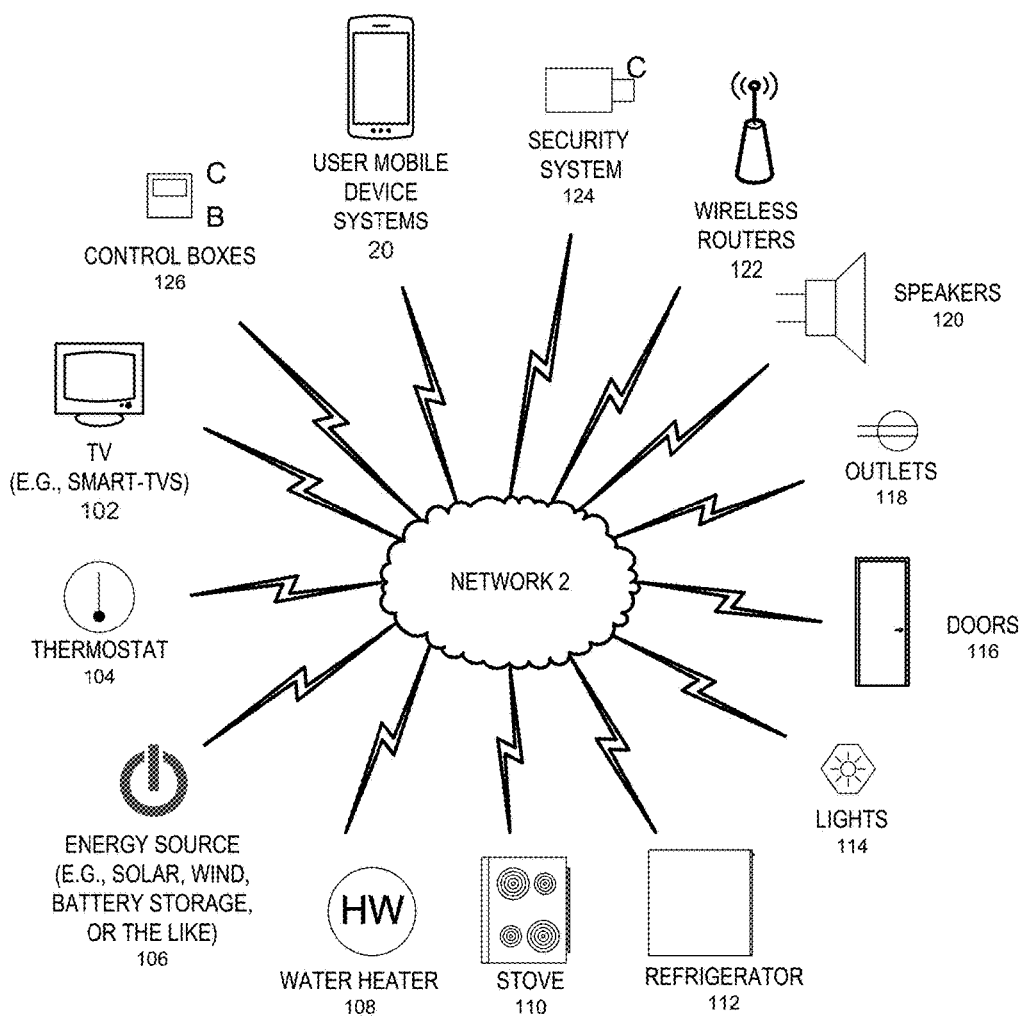

FIG. 2 illustrates a block diagram of linked home devices, in accordance with embodiments of the invention.

Figure 3:
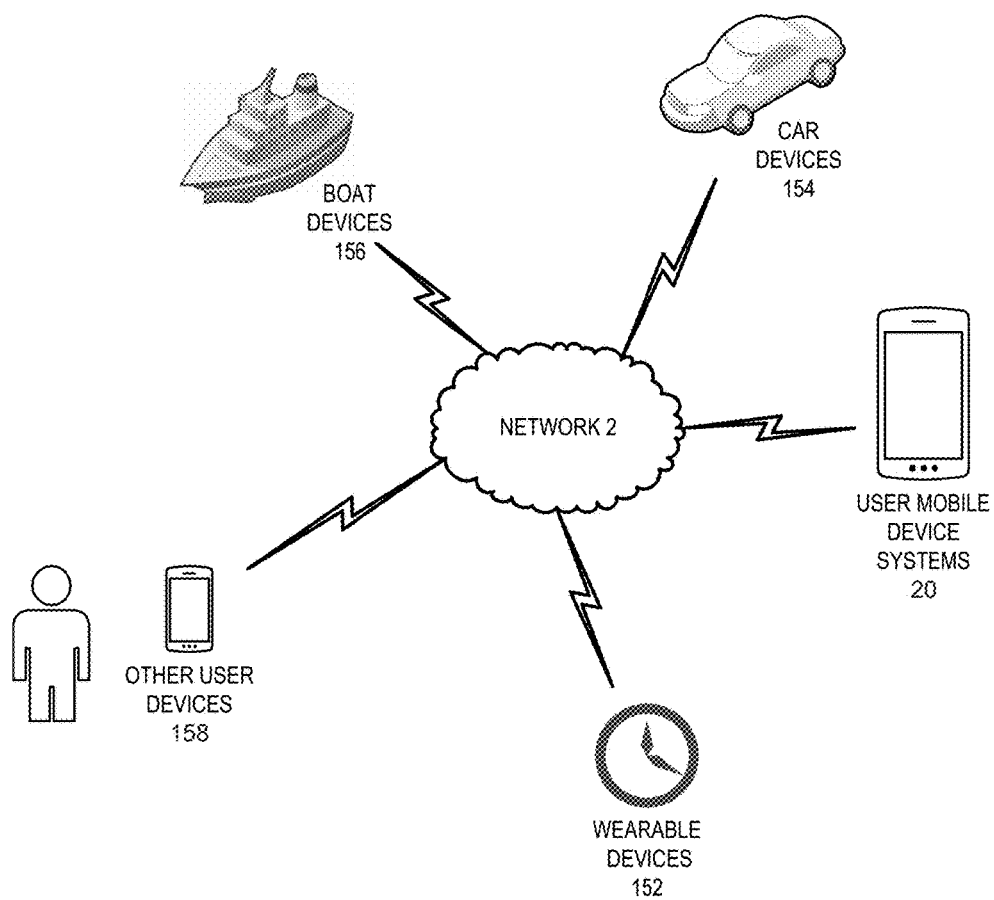

FIG. 3 illustrates a block diagram of linked personal devices, in accordance with one embodiment of the invention.

Figure 4A:
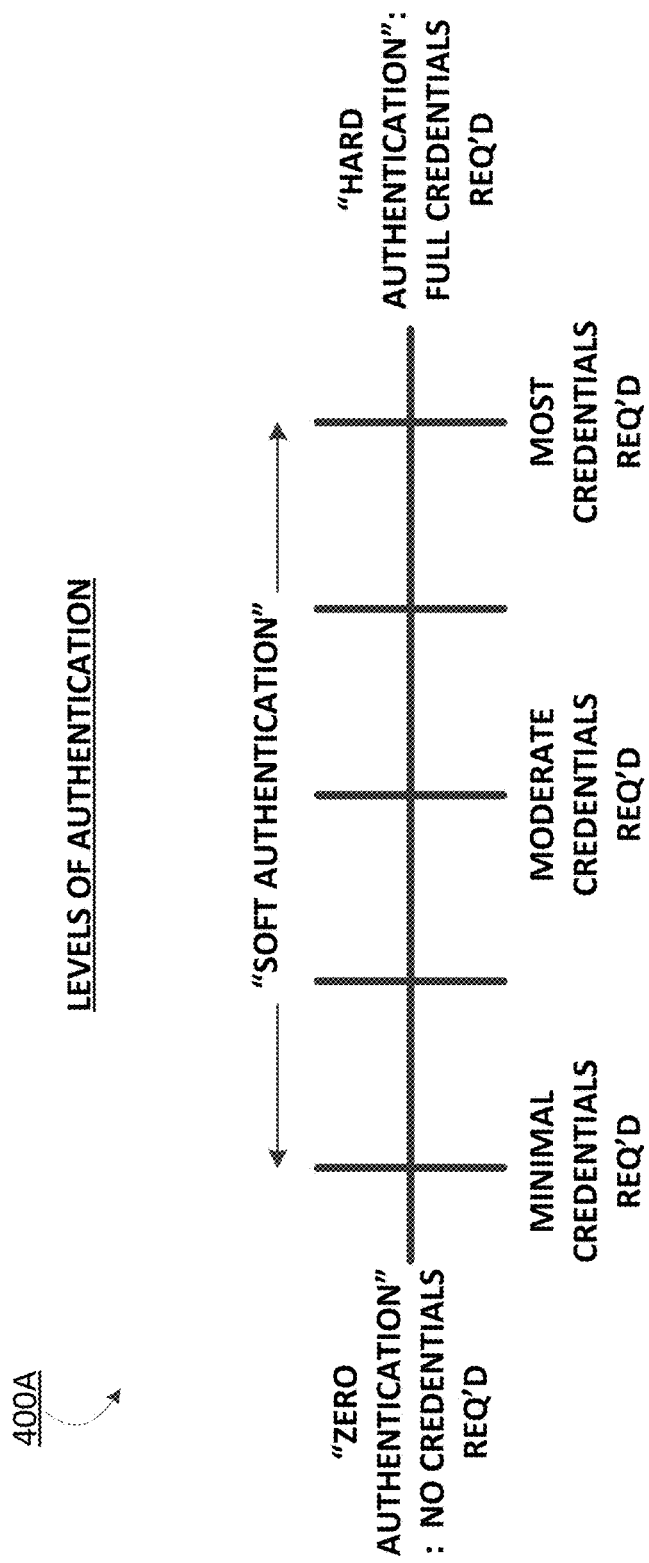

FIG. 4A presents an illustration of the authentication continuum in accordance to one embodiment of the invention.

Figure 4B:
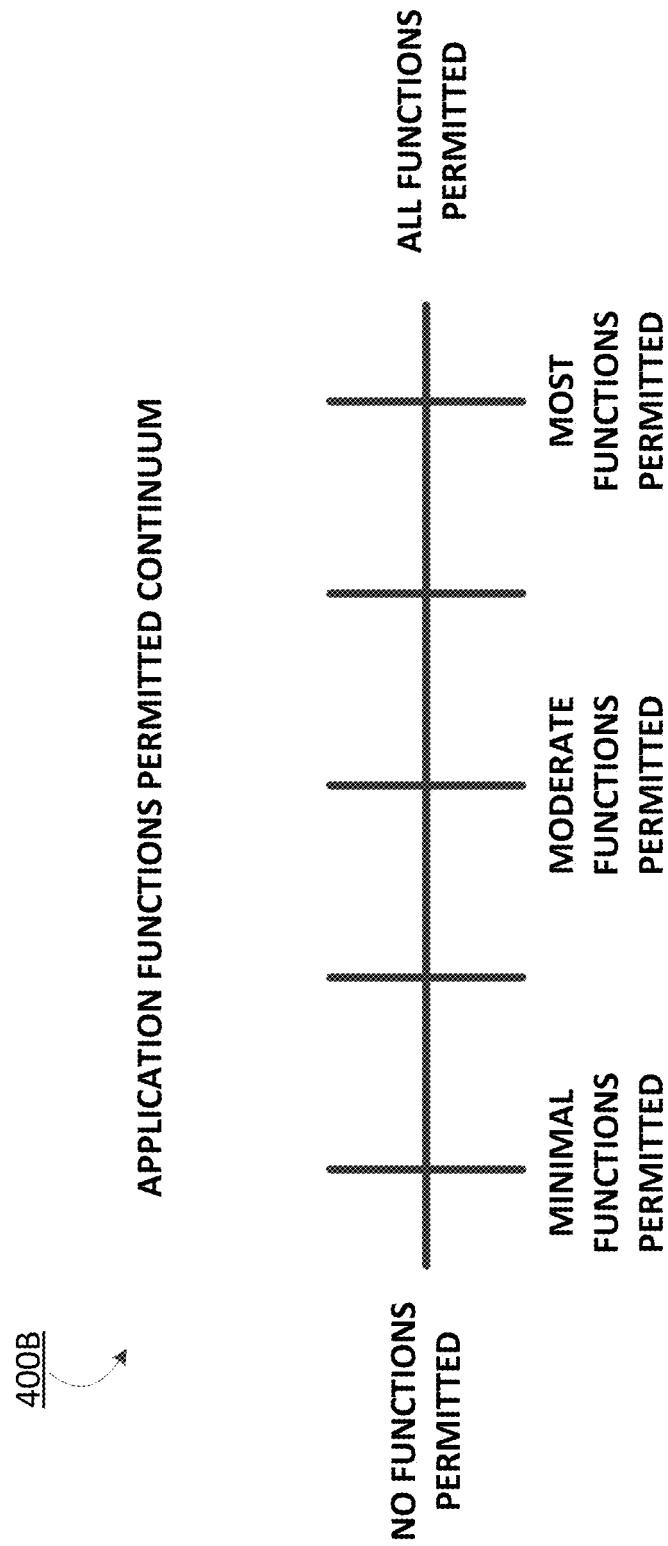

FIG. 4B presents an illustration of the application functions permitted continuum in accordance to one embodiment of the invention.

Figure 4C:
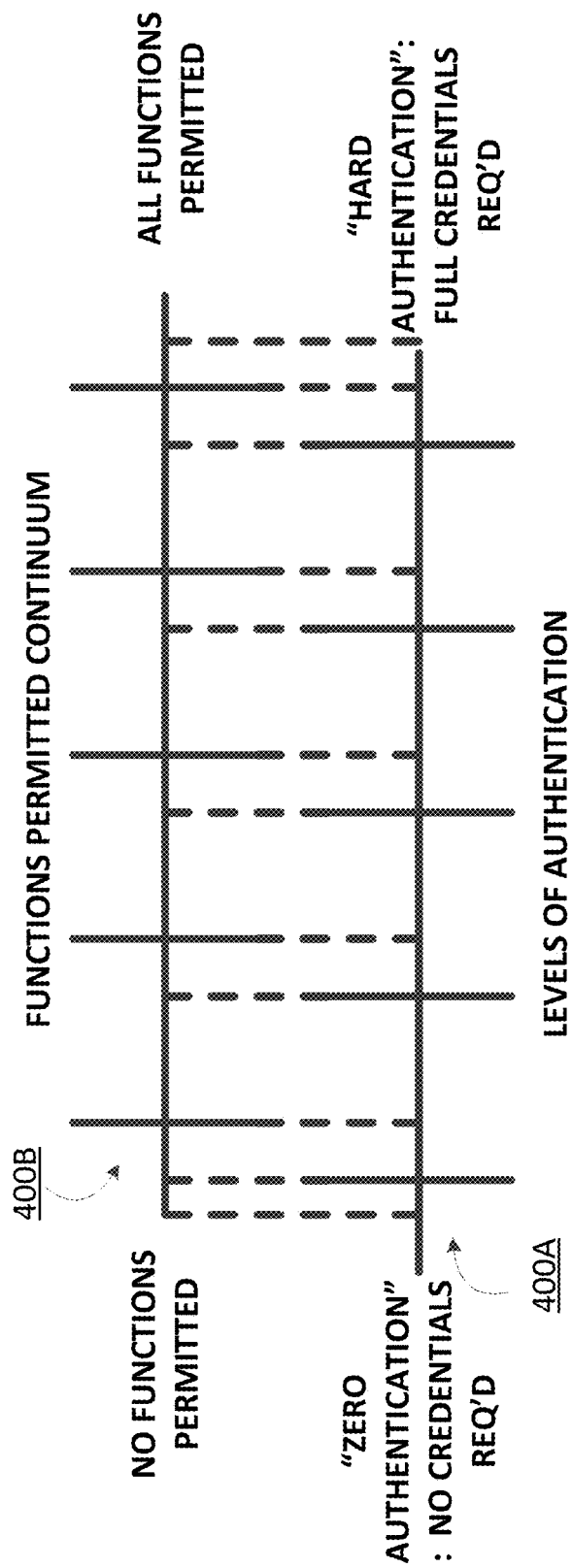

FIG. 4C presents an illustration of the coupling of the application functions permitted continuum and the levels of authentication continuum in accordance to one embodiment of the invention.

Figure 4D:
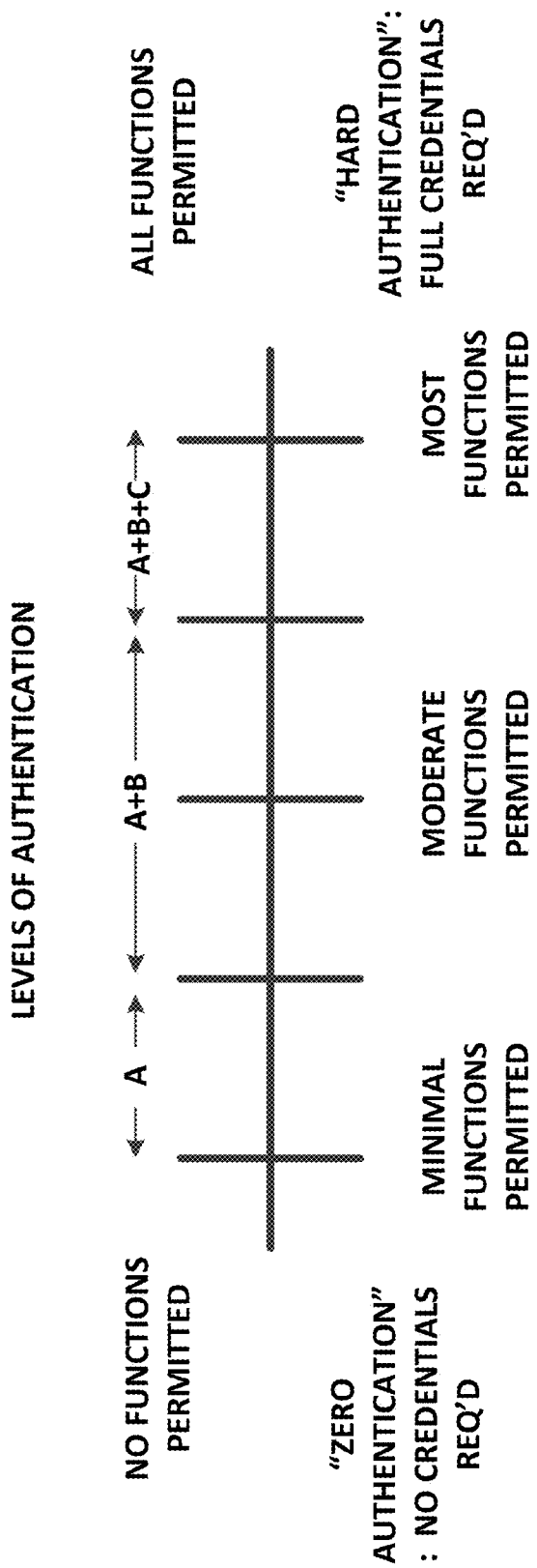

FIG. 4D presents an illustration of the relationship between the functions permitted and the authentication types in accordance to one embodiment of the invention.

FIG. 5 illustrates a high level process flow of embodiments of the invention, in accordance with one embodiment of the invention.

FIG. 6 illustrates a process flow for accessing the user computer system to determine applications thereon in accordance with embodiments of the invention.

Figure 7:
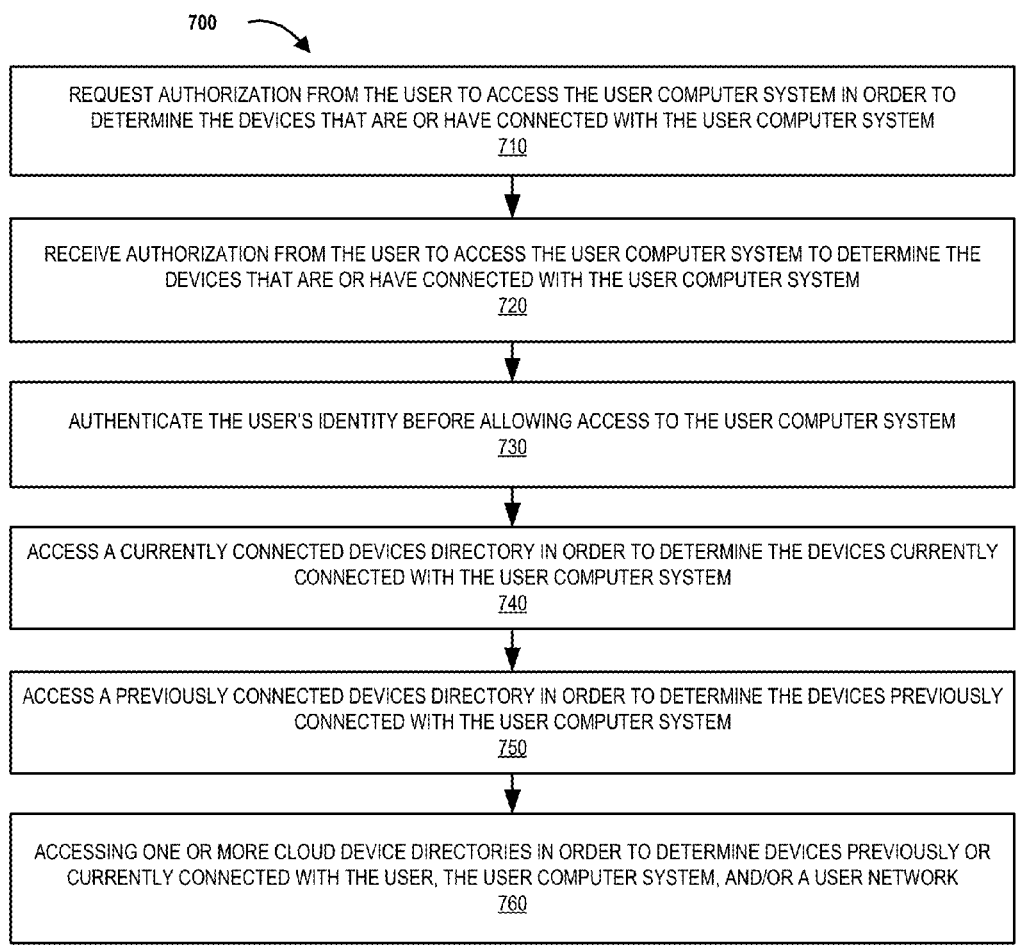

FIG. 7 illustrates a process flow for accessing the user computer system to determine devices connected therewith in accordance with embodiments of the invention.

Figure 8:
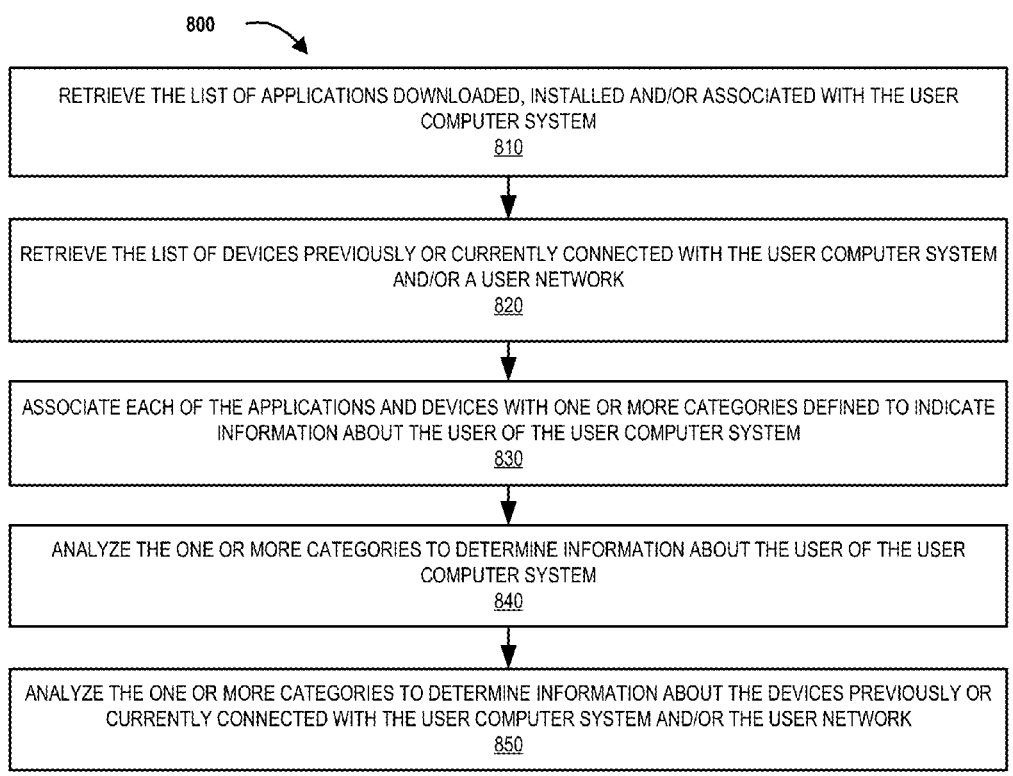

FIG. 8 illustrates a process flow for categorizing applications and devices to determine information about the user and the devices in accordance with embodiments of the invention.

Figure 9:
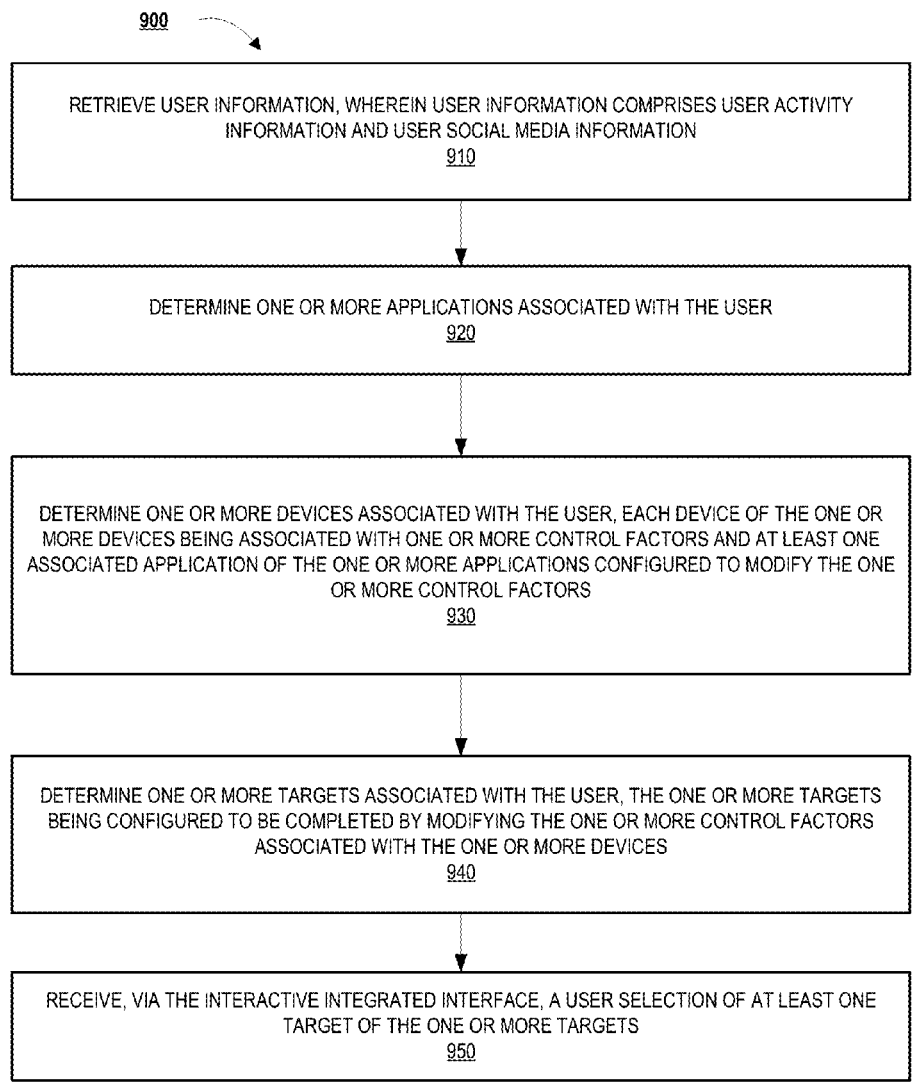

FIG. 9 illustrates a high level process flow for configuration and device connectivity based on user selection, in accordance with one embodiment of the invention.

Figure 10:
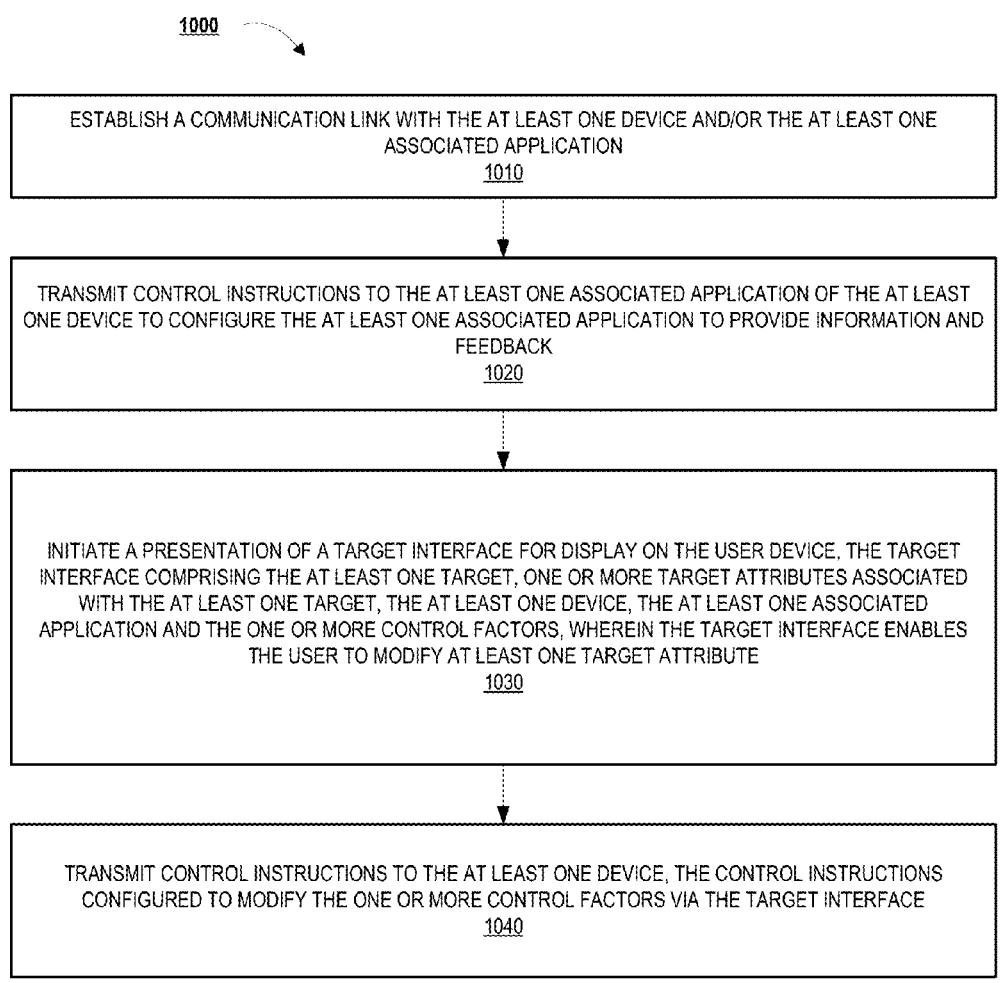

FIG. 10 illustrates a high level process flow for device connectivity and device control based on user selection, in accordance with one embodiment of the invention.

Figure 11:
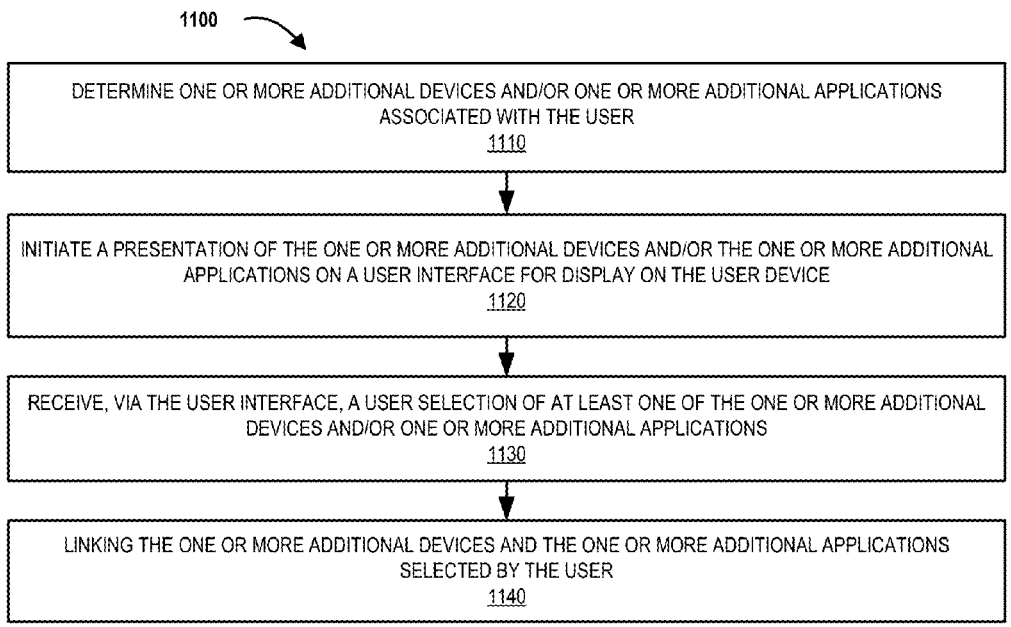

FIG. 11 illustrates a process flow for active configuration of devices based on user selection, in accordance with an embodiment of the invention.

Figure 12:
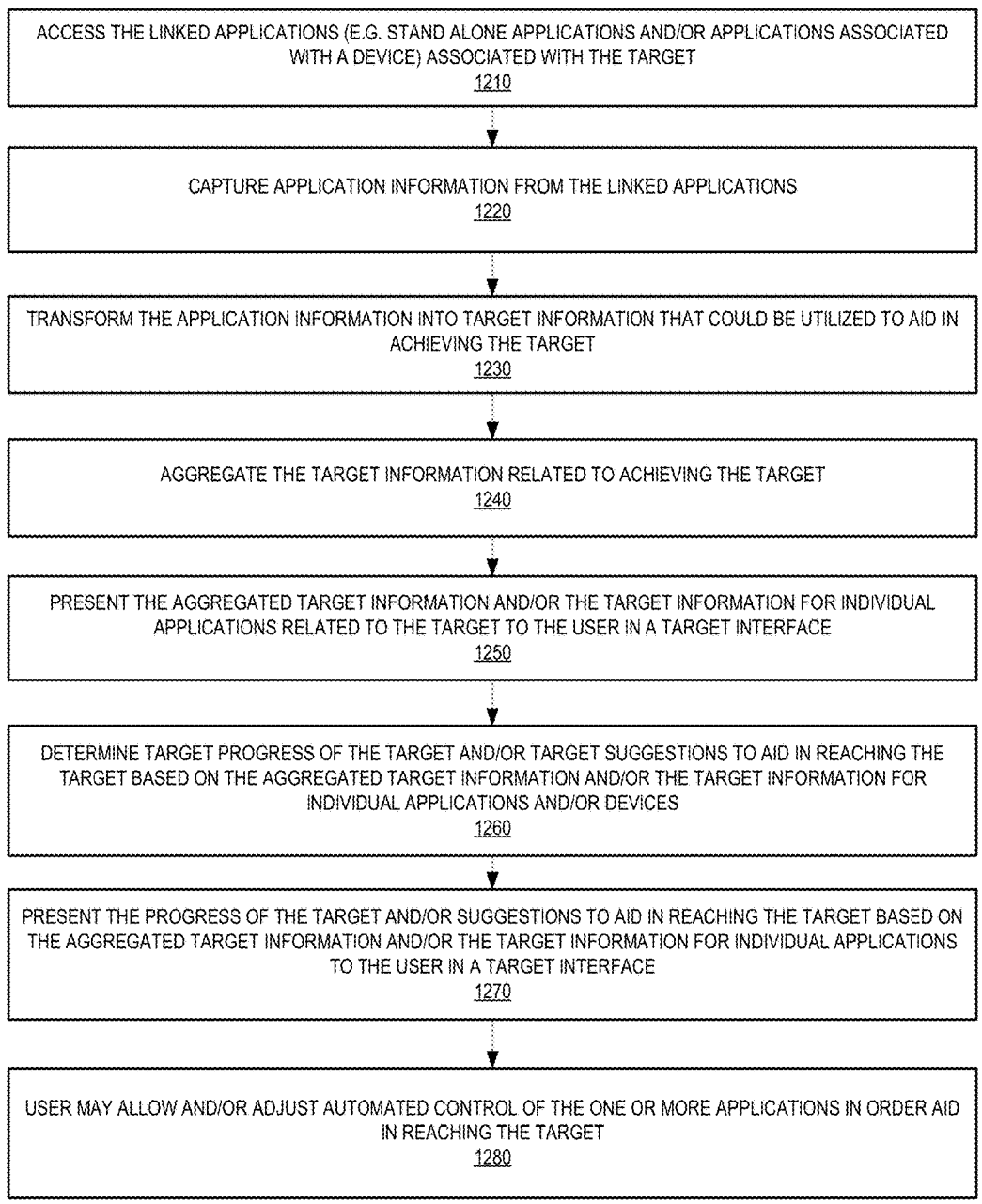

FIG. 12 illustrates a process flow for data aggregation, in accordance with an embodiment of the invention.

Figure 13:
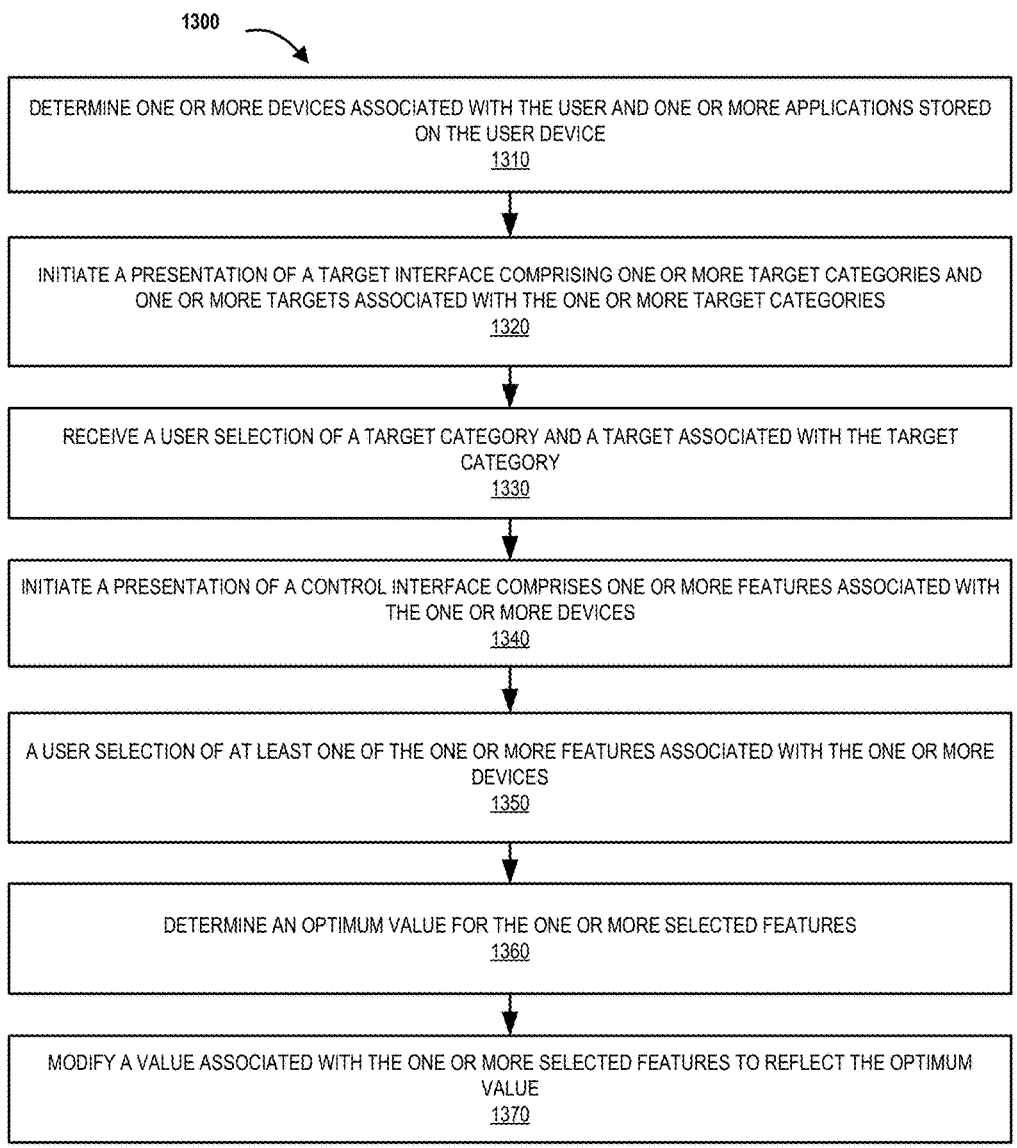

FIG. 13 illustrates a process flow for active selection configuration system with suggested actions, in accordance with an embodiment of the invention.

Figure 14:
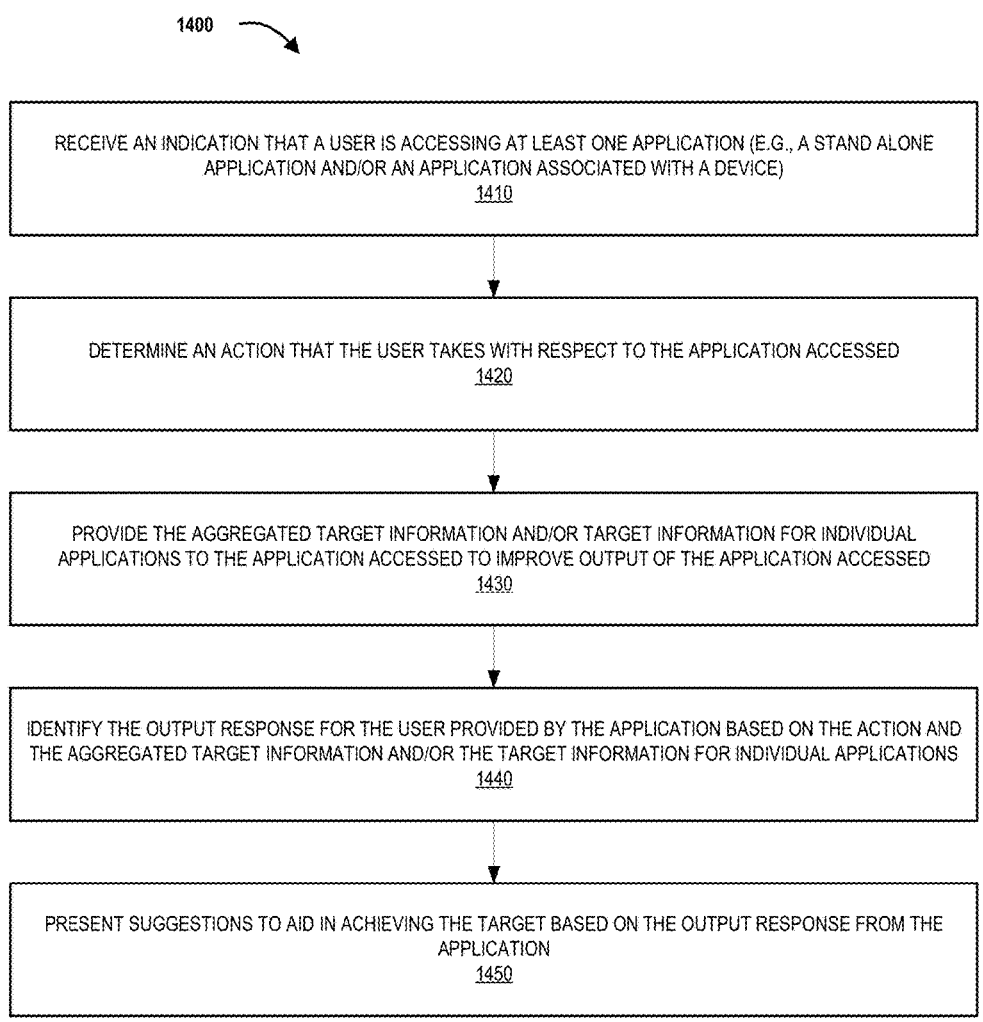

FIG. 14 illustrates a process flow for using the aggregated data to improve the user's experience when utilizing various applications to reach the target, in accordance with an embodiment of the invention.

Figure 15:
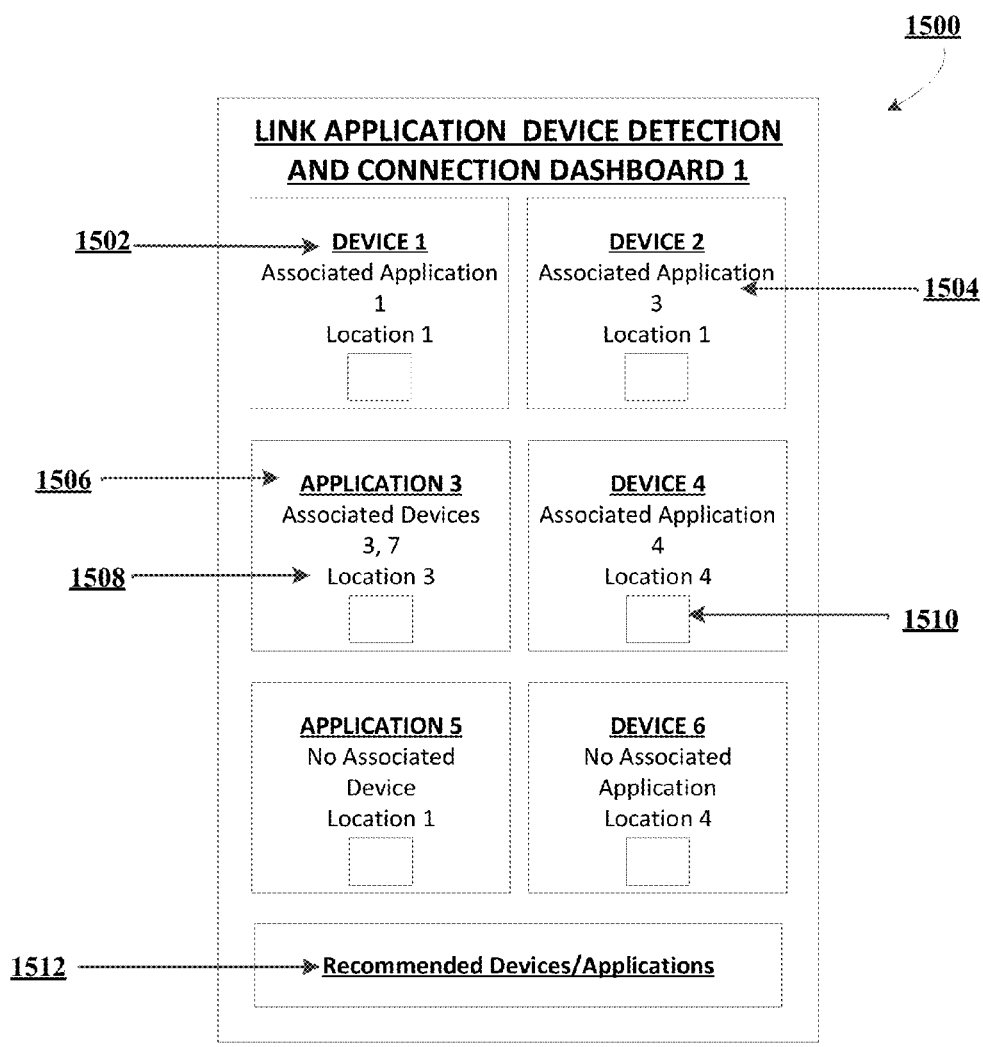

FIG. 15 illustrates a link application device detection and connection dashboard displayed on an interactive integrated interface in accordance with one embodiment of the invention.

Figure 16:
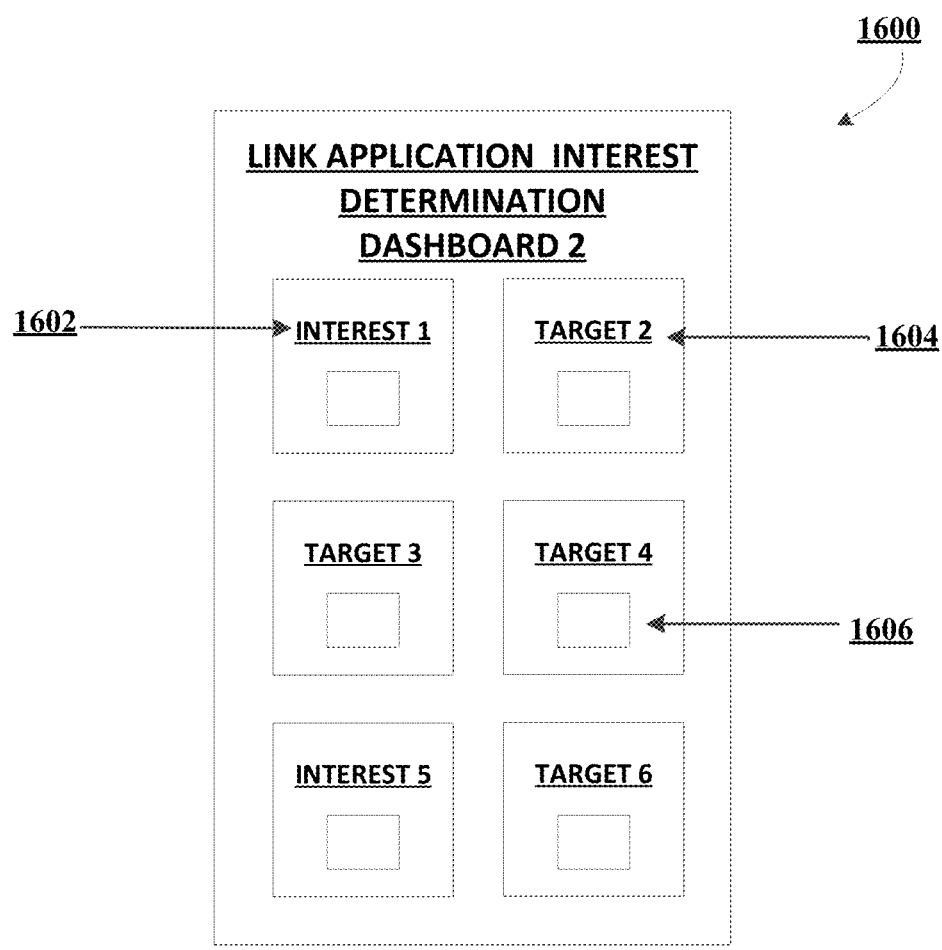

FIG. 16 illustrates a link application interest determination dashboard displayed on an interactive integrated interface in accordance with one embodiment of the invention.

Figure 17:
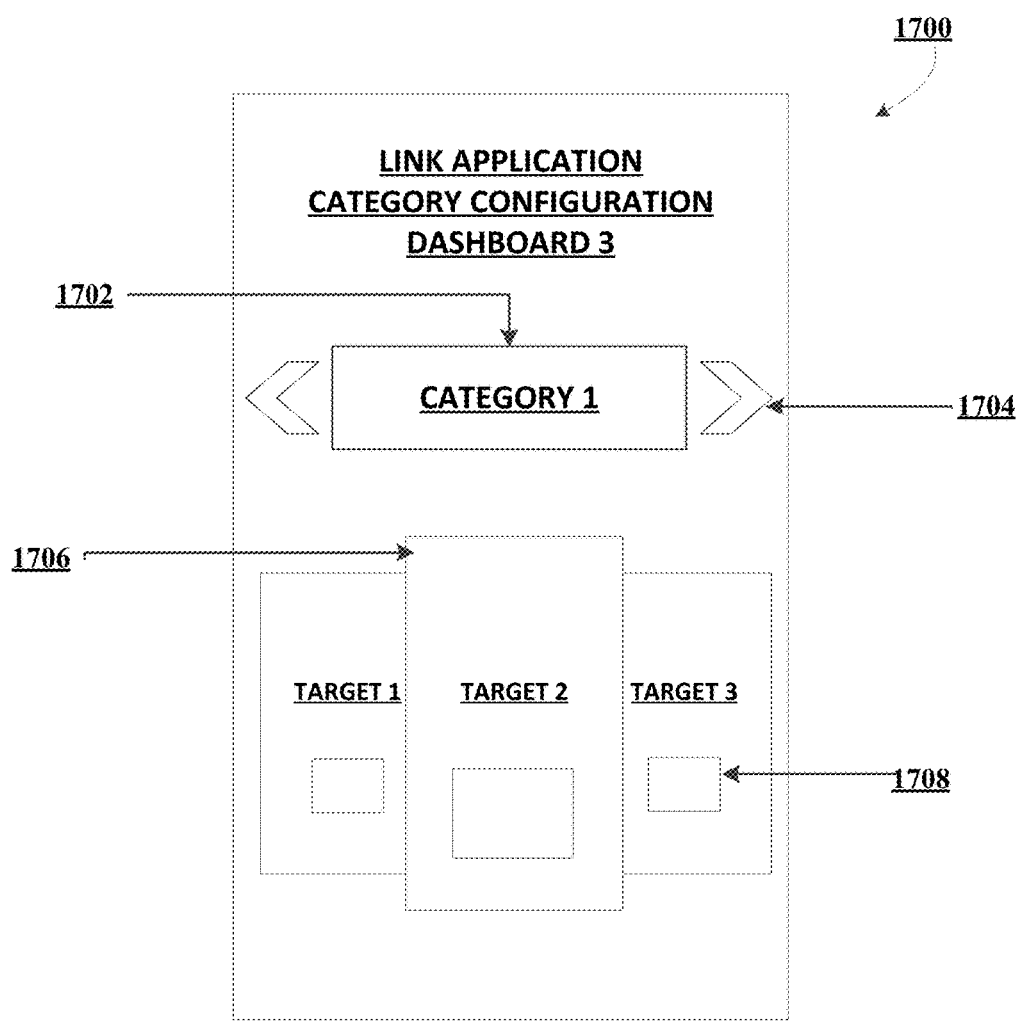

FIG. 17 illustrates a link application category configuration dashboard displayed on an interactive integrated interface in accordance with one embodiment of the invention.

Figure 18:
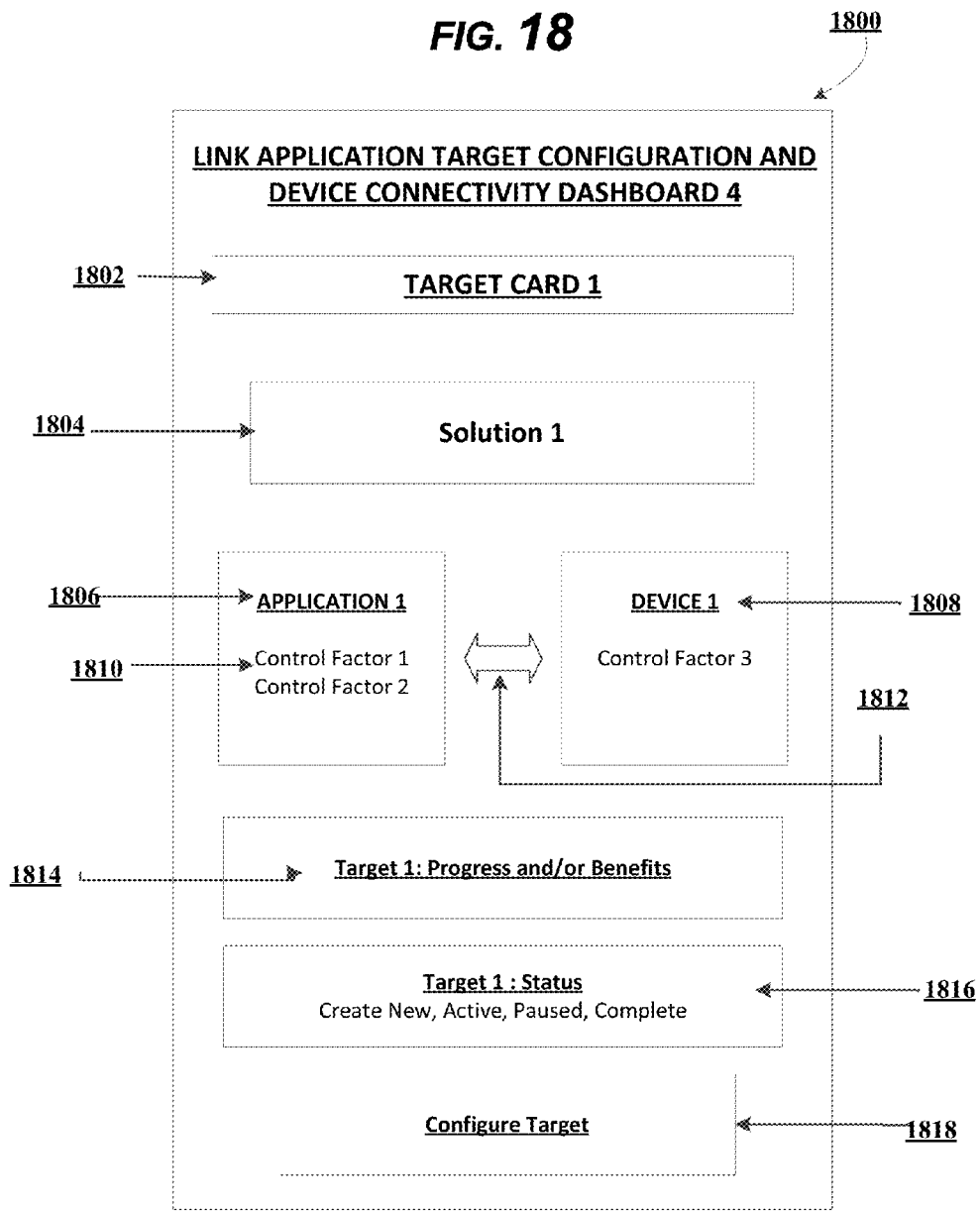

FIG. 18 illustrates a link application target configuration and device connectivity dashboard displayed on an interactive integrated interface in accordance with one embodiment of the invention.

Figure 19:
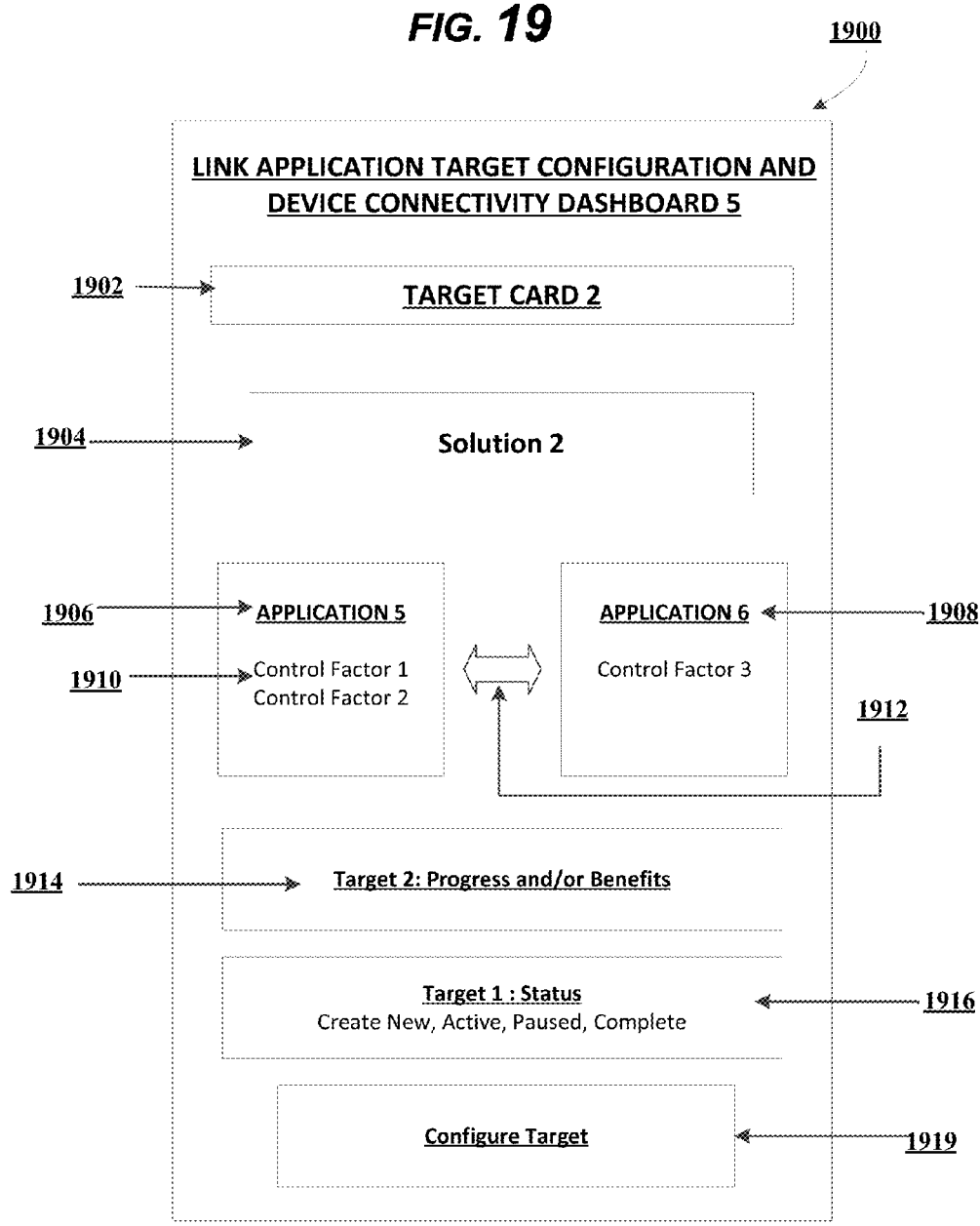

FIG. 19 illustrates the link application target configuration and device connectivity dashboard displayed on the interactive integrated interface in accordance with another embodiment of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Systems, methods, and computer program products are herein disclosed that provide the ability to identify applications and devices that a user utilizes, or have utilized in the past. The applications and devices are categorized and targets based on the categorized applications and devices are presented to the user for selection as graphical indicators (e.g., cards, or the like). After the user selects a target, additional applications and devices may be presented to the user that may help to achieve the target. The user may add the applications and/or devices at any point in time and the applications and/or devices may be combined with the other applications and devices related to the selected targets. The applications and devices related to the selected targets may be linked in a centralized location to allow monitoring of the applications and/or devices (e.g., manually by the user or automatically by the system). Information from the applications and/or devices are aggregated and feedback regarding the applications and devices are provided to the user in order to help the user achieve the selected targets. The applications and/or devices may be controlled automatically by the systems and/or manually by the user through the systems to help meet targets, as will be descried throughout this specification. The aggregated information related to the applications and/or devices may be shared with other entities to provide product (e.g., goods or services) suggestions to help the user reach the selected targets.

Embodiments of the invention allow for monitoring of combinations of devices that are associated with targets. It should be understood that different applications and/or devices may be related to different targets and may work together for achieving the targets or may have conflicting impacts on reaching the targets, such as aiding in one target while hindering another target. Information received from the applications and/or devices is transformed and aggregated in order to allow the user to manually, or the system to automatically, control the applications and/or devices in a centralized location to achieve the targets. For example, the user may control devices linked in the centralized located to achieve one or more targets, such as saving money by reducing costs, improving health, reducing energy consumption, improving investing returns, taking a vacation, saving money on food expenses (e.g., which may work counter to improving health), or any other like target that may be suggested to the user or selected by the user, as will be discussed throughout this specification.

FIG. 1 illustrates a link system environment 1, in accordance with embodiments of the invention. As illustrated in FIG. 1, one or more link systems 10 are operatively coupled, via a network 2, to one or more user computer systems 20, one or more financial institution systems 30, one or more other systems 40, and/or one or more devices 50. In this way, the user 4 (or one or more customers of the financial institution, or the like) may allow the link application 17 to take actions and/or utilize the link application 17 to communicate with (e.g., send or receive data from, control, or the like) the applications 27 and/or devices 50 associated with the user 4. The link application 17 may utilize the network 2 to communicate with applications 27 on the user computer systems 20, financial applications on the financial institution systems 30, other applications on other systems, or specific devices 50 (discussed in further detail with respect to FIGS. 2 and 3, and throughout the specification).

In some embodiments of the invention the one or more link systems 10 may monitor, store, and provide information related to applications 27 and devices 50 discussed herein in order to help the user 4 (e.g., customer, or the like) meet various targets provided automatically by the system or inputted by the user 4.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the link systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the user computer systems 20, the financial institution systems 30, other systems 40 (e.g., third-party systems, or the like), and/or devices 50. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the link systems 10 comprise computer-readable instructions 18 stored in the memory component 16, which in one embodiment includes the computer-readable instructions 18 of a link application 17. In some embodiments, the one or more memory components 16 include one or more datastores 19 for storing data related to the link systems 10, including, but not limited to, data created, accessed, and/or used by the link application 17.

The link application 17 may be a tool, website, mobile device app, other computer system app, applet, combinations or multiples thereof, or the like that is used to take the actions discussed throughout the specification. For example, the link application 17 identifies applications 27 and devices 50 that a user utilizes, categorizes the applications and devices, suggests additional applications and/or additional devices, provides graphical indicators (e.g., cards, or the like) associated with applications and devices (e.g., the ones utilized by the user and suggested for use) related to targets (e.g., provided by the user or determined automatically), allows users to link to the applications and devices, monitors the applications and devices, provides feedback regarding the applications and devices, allows the user to control the applications and devices through a centralized location, provides data (e.g., individual data or aggregated data) associated with the applications and devices to help meet targets, as will be discussed throughout this application.

As illustrated in FIG. 1, users 4 may access the link application 17, or other applications, through a user computer system 20. The user computer system 20 may be a desktop, laptop, tablet, mobile device (e.g., smartphone device, or other mobile device), or any other type of computer that generally comprises one or more communication components 22, one or more processing components 24, and one or more memory components 26.

The one or more processing components 24 are operatively coupled to the one or more communication components 22, and the one or more memory components 26. The one or more processing components 24 use the one or more communication components 22 to communicate with the network 2 and other components on the network 2, such as, but not limited to, the link systems 10, the financial institution systems 30, the other systems 40, and/or the other devices 50, which may or may not be specifically illustrated in FIGS. 2 and 3 and/or otherwise described herein. As such, the one or more communication components 22 generally comprise a wireless transceiver, modem, server, electrical connection, or other component for communicating with other components on the network 2. The one or more communication components 12 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the user computer systems 20 may have computer-readable instructions 28 stored in the one or more memory components 26, which in one embodiment includes the computer-readable instructions 28 of applications 27, such as dedicated applications (e.g., apps, applet, or the like), portions of dedicated applications, web browser or other apps that allow access to applications located on other systems, or the like. The applications 27 may include any type of application that the user may utilize, such as but in no way limited to, an appliance application, a wearable device application, a shopping application, a financial account application, a budgeting application, media application, social media application, exercise application, or any other type of application which may or may not be explicitly discussed herein. It should be understood that the applications 27 may be associated with and control the devices 50, or the applications 27 may be separate from specific dedicated devices 50, or may be a combination thereof (e.g., some applications 27 related to and used for controlling the devices 50, and some applications that are unrelated to the devices 50).

As illustrated in FIG. 1, the financial institution systems 30 are operatively coupled to the link systems 10, user computer systems 20, other systems 40, or the like, through the network 2. The financial institution systems 30 have components the same as or similar to the components described with respect to the link systems 10 and/or user computer systems 20 (e.g., one or more communication components, one or more processing components, and one or more memory devices with computer-readable instructions of one or more applications, one or more datastores, or the like). Thus, the financial institution systems 30 communicate with the link systems 10, the user computer systems 20, and the other systems 40, and/or each other in same or similar way as previously described with respect to the link systems 10 and/or the user computer systems 20. The financial institution systems 30, in some embodiments, may include financial institution accounts, which the user may utilize to set cost targets, pay for products, receive rewards, receive or send funds, or take any other monetary actions that are related to the one or more targets in the link application, the user computer systems 20, the other systems 30, the devices 50, or the like.

The other systems 40 (e.g., other financial institution systems, merchant systems, social networking systems, systems associated with the devices 50, systems associated with the applications 27 on the user computer systems 20, or the like) are operatively coupled to the link systems 10, user computer systems 20, and financial institution systems 30, through the network 2. The other systems 40 have components the same as or similar to the components described for the financial institution systems 10 and the user computer systems 20 (e.g., one or more communication components, one or more processing components, one or more memory components with computer-readable instructions, one or more applications stored in the one or more memory components, one or more datastores, or the like). Thus, the other systems 40 communicate with the link systems 10, the user computer systems 20, and the financial institution systems 30, and/or each other in the same or similar way as previously described with respect to the link systems 10, the user computer systems 20, and/or the financial institution systems 30. The other systems 40, in some embodiments, provide the information and control that can be used to reach the targets of the user 4 and/or access and control the devices 50, or may be other types of systems 30 related to social networking, financial information, or any other systems related to entities that send or receive information through the network 2.

The devices 50 (e.g., as described with respect to FIGS. 2 and 3, or the like) are operatively coupled to the link systems 10, user computer systems 20, and financial institution systems 30, through the network 2. The devices 50 have components the same as or similar to the components described for the financial institution systems 10 and the user computer systems 20 (e.g., one or more communication components, one or more processing components, one or more memory components with computer-readable instructions, one or more applications stored in the one or more memory components, one or more datastores, or the like). Thus, the devices 50 communicate with the link systems 10, the user computer systems 20, the financial institution systems 30, other systems 40, and/or each other in the same or similar way as previously described with respect to the link systems 10, the user computer systems 20, the financial institution systems 30, and/or the other systems 40.

As illustrated in FIG. 2, the devices 50 may include devices within a household environment 100, such that user computer systems 20 (e.g., user mobile device, or the like) can communicate with TVs 102 (e.g., smart-tvs for turning off, controlling brightness settings, or the like); thermostats 104 (e.g., for turning up or down the temperature based on time of day, outside temperature, location of users within the home, or the like); home energy sources 106 (e.g., control alternative sources of energy such as use of solar, wind, battery storage, or other like devices including sources of energy that power personal devices 50); water heaters 108 (e.g., determine temperatures at which to set the hot water, when to turn on/off hot water heating based on user patterns); stoves 110 (e.g., for running the stove more efficiently); refrigerators 112 (e.g., turning up/down the temperature of the cold and freezer locations based on time of day, how often the doors are open, and amount of goods in the refrigerator); lights 114 (e.g., turning on/off lights, dimming lights or the like based on time of day, or the like); doors 116 (e.g., sending notifications when doors are open or when hot/cold air is leaking through the door, such as door cracks); outlets 118 (e.g., turning off smart outlets when the devices plugged into the outlets are not being used to prevent energy bleeding); speakers 120 (e.g., turning off wired or wireless speakers when not in use); wireless routers 122 (e.g., controlling on/off or use of wireless systems); security system 124 (e.g., remotely controlling a user's security system), and/or any other control box devices 126 that may be integral with or attached to any of the forgoing (e.g., boxes not a part of a TV, but connected to a TV to allow "smart" functions, or the like), or other devices 50. As such, the user 4 may control or monitor (e.g., manually or allow automatic control) any of these devices 50 through the use of one or more applications 27, or as described in further detail later, through the use of a linked application 17 in order to achieve targets which may be impacted by one or more of the devices 50. These devices 50 may communicate over the network 2, as was previously described with respect to the linked system environment 1 discussed and illustrated in FIG. 1. Moreover, the user 4 may send, or receive, any information captured by the devices 50 or used by the devices 50.

As illustrated in FIG. 3, the devices 50 may also include devices associated with a personal environment 150, such as a wearable devices 152 (e.g., watch, exercise band, glasses, device embedded into shirts, shoes, jewelry, skin, or the like that may monitor a user's exercise, stress, heat rate, distance traveled, or health related metrics, or may be used to enter into transactions, or the like); a vehicle device 154 (e.g., device integral in a car and/or attached to the car that monitors how and/or where a user drives, or the like); a boat device 156 (e.g., provides similar monitoring as the vehicle device), other motorized or manual transport (e.g., scooter, cycle, or the like that provides similar monitoring as the vehicle device); devices of other users 158 (e.g., mobile devices of dependents, such as children or parents, employees, or the like that may be utilized to determine the location of users in order to determine when devices 50 in the home environment 100 may be turned on/off, monitor the movement of the other users, or the like). As previously discussed with respect to the household environment 100, the user 4 may control and monitor (e.g., manually or allow automatic control) any of these devices 50 in the personal environment 150 through the use of one or more applications 27, or as described in further detail later, through the use of a linked application 17 in order to achieve targets which may be impacted by one or more of the devices 50. These devices 50 may communicate over the network 2, as was previously described with respect to the linked system environment 1 discussed and illustrated in FIG. 1. Moreover, the user 4 may send, or receive, any information captured by the devices 50 or used by the devices 50.

It should be understood that the systems or devices 50 described herein may communicate with each other through the use of Wi-Fi connections, Bluetooth, NFC, other wireless connections, physical connections, or the like.

Typically, the user may be required to authenticate identity for access to an application or device, or for access to a particular feature, function or action of an application or device. Numerous types and levels of user authentication exist. For example, a user may authenticate his or her identity using a unique alias such as a username and/or password. Further, in some situations, challenge questions, familiar pictures and/or phrases, biometrics, key fob-based alphanumeric codes and/or collocation, authentication of another application such as a similar application or an "overarching" application, and/or the like may be used as types of identity authentication.

The different types of authentication may provide differing degrees of confidence regarding the authentication using such types. For example, if a username by itself is used for a first user authentication, and a username along with a password is used for a second authentication, then the second authentication should provide a higher confidence regarding the authentication because of the additional layer of authentication required. Further, within the types of authentication, varying levels of confidence may be used. For example, when using a password, an administrator may require users to create a password according to strict rules designed to increase the security level of the password, and therefore increase the confidence of any authentication using the password.

Accordingly, a continuum of authentication may be used to quantify (or dictate) the levels of authentication. Likewise, a continuum of functions permitted may be used to quantify (or dictate) the number or context in which functions are permitted.

Referring to FIG. 4A, a continuum of authentication 400A is illustrated according to embodiments of the invention. On the left-hand side of the continuum, a "zero authentication" requires no authentication credentials. On the right-hand side of the continuum, a "hard authentication" requires full authentication credentials. This means that it requires the strictest combination of credentials. In between the two extremes, "a soft authentication" requires minimal credentials, moderate credentials or most credentials for various points along the continuum. The continuum generally represents the number of credentials required and/or the relative strength of the credentials required for that point on the continuum. As discussed below with reference to FIG. 4C, the continuum of authentication 400A may be coupled with an application functions permitted continuum 400B, first illustrated in FIG. 4B.

Referring to FIG. 4B, the application functions permitted continuum 400B illustrates various levels of application functions permitted. Functions may refer to what a user is permitted to "see" and/or what the user is permitted to "do". More specifically, this may refer to whether a specific function is permitted at a certain point on the continuum and/or the context in which a certain function is permitted. The left-hand side of the continuum indicates that no functions are permitted, and the right-hand side of the continuum indicates that all functions are permitted. In between the extremes, minimal functions are permitted, moderate functions are permitted and most functions are permitted. Thus, any given point along the continuum 400B corresponds with a certain amount and/or number of functions that are permitted and/or the context in which certain functions are permitted.

Referring now to FIG. 4C, a diagram 400C illustrates a coupling of the application functions permitted continuum 400B and the levels of authentication continuum 400A. As shown, the continua 400B and 400A may be coupled with one another such that the various points along the continua intersect at specific points of the coupled continuum. For example, one continuum may be moved left or right with respect to the other continuum in order to achieve a different relationship between the functions permitted and the credentials required. Accordingly, for a given coupling, a specific point on continuum 400B provides that a particular function or functions may be permitted given that a specified level of authentication credentials are supplied, as indicated by the corresponding point on continuum 400A. For example, a financial institution and/or a user may arrange the continua 400B and 400A with respect to one another and may adjust the arrangement based on changing desires or goals.

In some embodiments, one or both the continua 400B and 400A may have weighted scales such that, as a point on the continuum is moved, the corresponding functions permitted and/or level of authentication required may change exponentially or otherwise. Furthermore, in various embodiments, other representations of the various functions permitted that correspond with the various levels of authentication may be used by the invention.

Referring now to FIG. 4D, a diagram 400D illustrates a relationship between the functions permitted and the authentication types. As shown in FIG. 4D, the soft authentication continuum between zero authentication and hard authentication may include one or more authentication types (A, B, C in the Figure). In one aspect, the one or more authentication types corresponding to the one or more authentication credentials received from the user and one or more functions associated with the application permitted for user access are positively correlated. For example, a username may enable the user to gain access to checking balance, a username and password may enable the user to gain access to checking balance, funds transfer between the user's first bank account and second bank account, and downloading previous statements, and a username, password and challenge question may enable the user to gain complete access to all the functions of the applications and devices. In one aspect, the user may have to provide authentication credentials corresponding to authentication types A and B to gain access to moderate functions associated with the application. For example, the user may provide a username and password to access a balance check and funds transfer. In another aspect, the user may have to provide authentication credentials corresponding to authentication types A, B, and C to gain access to most function associated with the application. For example, the user may provide a username, password, and a personal identification number to access a balance check, a funds transfer, a deposit, and a bill-pay. In yet another aspect, the user may have to only provide authentication credentials corresponding to authentication type A to gain access to minimal functions associated with the application. For example, the user may provide a username to access a balance check.

In some embodiments of the invention one or more of the systems described herein may be combined with each other, or otherwise perform the functions of the other systems described herein. In other embodiments of the invention one or more of the applications described herein may be combined with each other, or otherwise perform the functions of the other applications described herein. Furthermore, the applications may be any type of application, such as an application stored on a desktop, server, or other device, a mobile application stored on a mobile device, a cloud application, or other like application. As such, the applications described herein, or portions of the applications described herein may be stored and operated on any of the systems or devices 50 described herein. For example, a portion of the link application 17 may be stored on the user computer systems 20, or may be included as a portion of financial institution applications, such as an online banking application, in order to achieve the inventions described herein.

It should be understood, that the systems and devices 50 described in FIGS. 1-3, or other devices not specifically described herein, may be configured to establish a communication link with each other in order to accomplish the steps of the processes described herein. The link may be an internal link within the same entity (e.g., within the same financial institution or device provider) or a link with the other systems of entities (e.g., social networking systems, third-party systems, or the like). In some embodiments, the systems may be configured for monitoring the applications 27 and devices 50 that the user utilizes. The information received from monitoring may be provided via wireless network path portions through the Internet. When the systems or devices 50 are not monitoring a source or are not being monitoring, the information need not be transmitted from the source through the Internet to the destination, although it could be. The sources of information may be made continuously available, however, continuously available does not necessarily mean that the sources actually continuously generates data, but that a source is continuously available to generate and send data real-time (e.g., instantaneously and/or within a few seconds, or the like) of receiving a request for it. In any case, the sources may be continuously available to receive and/or generate information, in some cases in digitized data in Internet Protocol (IP) packet format. In response to continuously monitoring the real-time data feeds from the various systems or devices 50, the system may be configured to provide target information to the user 4 and/or allow the user to make changes to or control the applications 27 and/or devices 50, in part in order to reach the target.

Moreover, it should be understood that the process flows described herein include transforming the information sent and/or received from the applications of the different systems (e.g., internally or externally) and/or the devices 50 from one or more data formats into a data format associated with the link application 17 for display to the user 4 on the user computer systems 20. There are many ways in which information is converted within the linked system environment 1. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may converting to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

In some embodiments, the system provides a comprehensive integrated platform for device discovery, active device control and target configuration. In this regard, the system may establish an operative communication channel with a user device associated with a user through a suitable network. The user device, as described above, may be a mobile device, a computing device (for example, desktop/laptop computer, tablet computer, smartphone, and the like), a personal digital assistant, a wearable device or any other device comprising a processor or a microprocessor, configured to run one or more applications. In some embodiments, establishing an operative communication channel may comprise, registering one or more user devices, determining user device and network identifiers (for example, mobile identification numbers, unique serial numbers, phone numbers, subscriber identification numbers, IP address, and the like) and receiving access permissions from the user. In some embodiments, the user may initiate the operative communication channel by installing a link application 17 on a user device. The link application 17 may be configured to access one or more applications on the user device, one or more devices/functionality associated with the user device (for example, global positioning device (GPS), camera, motion sensors and the like) and one or more applications and devices associated with user devices. In some embodiments, the link application 17 may augment or replace the interfaces of an existing operating system of the user device. In this regard, the link application 17 may cause the operating system to perform one or more functions.

In some embodiments, the link application 17 provides an interactive integrated interface on the user device, for example, the user's smartphone or a tablet computer. The interactive integrated interface may comprise one or more interfaces or dashboards, comprising audio, visual and/or tactile elements, presented on the user device. In some embodiments, the interactive interface may comprise a link application device detection and connection dashboard 1500, a link application interest determination dashboard 1600, a link application category configuration dashboard 1700 and a link application target configuration and device connectivity dashboard 1800-1900, illustrated in FIGS. 15-19, which will be discussed in further detail throughout the specification.

FIG. 5 illustrates a high level process flow according to embodiments of the invention. As illustrated by block 510, the system accesses the user computer systems (e.g., accessing the user's mobile device, or the like, with authorization from the user 4). After accessing the user computer system 20, embodiments of the invention determine the applications that the user 4 has on the user computer system 20. For example, the user may utilize a travel application, thermostat application, marketplace application, social media application, payment application, exercise application for an exercise device, traditional media application, interactive computer device, or any other type of application that is discussed or not specifically discussed herein.

As illustrated by block 520 in FIG. 5 the system further determines the devices that are currently connected to the user computer system 20 and/or that have been connected to the user computer system 20 in the past. For example, as illustrated by FIGS. 2 and 3, the user may utilize a wearable device 152, a smart thermostat device 104, a smart TV device 102, light devices 114, outlet devices 118, vehicle devices 154, or the like.

Block 530 in FIG. 5 illustrates that the system categorizes the applications 27 and/or devices 50 in order to determine information about the user. This information may be used to identify targets, suggest other applications or devices to meet the targets, provide suggestions for achieving the targets, provide other related content, or the like to present to the user based on the categories of applications and/or devices, as discussed in further detail throughout this specification. The categories including the applications 27 and/or devices 50 may be displayed to the user 4 on the customer computer system 20 through a link interface, as illustrated in one embodiment in FIGS. 15-19.

As illustrated by block 540, based on the categorization of the applications 27 and/or the devices 50 (e.g., being currently utilized or suggested by the system as described below), the system uses information from the applications 27, devices 50, connection discovery with the devices, transactional account information, social media information, pattern data of a user device, or the like to determine targets that may be of interest to the user 4 and suggest the targets to the user based on "target cards" or other graphical indicators, which may displayed graphically to the user 4 in a target interface. An example of one embodiment of the target interface is illustrated in FIGS. 15-19. The target interface illustrates different types of targets that the user 4 may be interested in based on the applications 27 and/or devices 50 that the user utilizes, have utilized in the past, or may utilize in the future (e.g., if the user decides to download the application in the future, or the like). The targets may be presented in the form of cards (or other graphical indicators) that illustrate information about each of the targets, such as but not limited to if a connection is made between the link application 17 and the applications 27 and/or devices 50, account balance information for the user accounts, monthly budget information related to the applications 27 and/or devices 50, and control and monitoring information related to the applications 27 and/or devices 50.

Block 550 illustrates that following a selection of a target by a user, the system configures the applications 27, devices 50, and the like associated with the user 4 to provide information and feedback associated with the selected target to the user 4 in a target interface. For example, once the user 4 selects a target card, the system monitors the target, interacts with any applications 27 and/or devices 50 used to meet the target.

Block 560 of FIG. 5 illustrates that the system may determine additional applications and/or devices that may help with achieving the target. For example, in order to meet the user's "energy target," the system may suggest the purchase of smart thermostat 104, smart outlets 120, or the like. The system may push information regarding the target to service providers for offers to present to the user 4. For example, if the target is travel, the system could push info to travel companies such as amount available to spend, preferences of the user, places the user has not traveled to before, or the like in order to identify more detailed offers. If the target is investing, the system could send investment articles relevant to the user 4, or the like. Alternatively, the system could send deals, coupons, or the like, when it detects a user is in a particular store and at least one of the user targets are related.

Block 570 illustrates that the system monitors the ability of the user 4 to meet the selected one or more targets through aggregation of the data (e.g., application and/or device information). For example, the system may prompt the user to log into devices through applications, into applications, such as other accounts, rewards programs, or the like that the user 4 maintains that are relevant to the one or more targets selected. The system may then aggregate data from these devices 50 and applications 27, as well as use the log in as access to control the devices 50 and/or applications 27 (as described below). The system allows for control to ensure that target is met, can note when added funds are available for the target, can note rewards that can be applied to the target, etc. The system can also note when the user 4 has items turned off, or does not have items that if added would enhance the target and provide suggestions for such additions.

As illustrated by block 580, the system may automatically control the applications 27 and/or devices 50 in order to aid the user 4 in achieving the user's target. For example, the system may control the devices 50 via selections made by the user 4 via the interface, such as adjusting a smart thermostat 104 based on target selections set by the user 4. In other examples, the system determines that the users 4 (e.g., the user through which the applications are run and any associated users) are not located at the user's home, and in response the system may automatically turn down the heat or air conditioner to save energy and/or turn off lights that have been left on. The system also monitors the patterns of the users 4 or detects when users 4 are not using the devices 50, such as when the users 4 are travelling. The system notes the on-time patterns of the devices 50, and controls the devices based on the patterns of the user 4.

Block 590 illustrates that the system may also use the aggregated data from the devices 50 and/or applications 27 to prepopulate data in other apps, such as data used to refine searches on internet browsers, real estate sites, marketplace websites, social media sites, or the like. For example, a user's data and targets indicate various components of a real estate search, such as budget, style, or the like. This data is provided to real estate websites to create inputs to search filters to make it easier to identify the real estate in which user 4 is interested. In other examples, the user's exercise habits may be determined through wearable devices 152, and the aggregated data from the devices may be presented to fitness applications to help improve upon the effectiveness of the user's exercise habits, while also reducing user costs associated with the user's exercise.

The broad concepts illustrated and described above with respect to FIGS. 1-5, and in particular with respect to the process flow described in FIG. 5, will be described individually or in combination with each other in further detail below. FIG. 6 illustrates a process flow for accessing the user computer system 20 (e.g., the mobile device system which is one type of user computer system) to determine applications downloaded, installed and/or associated with the user computer system 20 or user network according to embodiments of the invention. The first step, as represented by block 610, is to request authorization from the user 4 to access the user computer system 20 in order to determine the applications that the user has on the user computer system 20. The next step, as represented by block 620, is to receive authorization from the user to access the user computer system 20 to determine the applications that the user 4 has on the user computer system 20. This interaction with the user 4 may take place in a variety of ways in different embodiments. For example, the request for authorization may be transmitted from the financial institution systems 30 to the user mobile device system 20 and the user mobile device systems 20 may then communicate the request to the user 4. Then, the user mobile device systems 20 can communicate back to the financial institution systems 30. In other embodiments, the user mobile device systems 20 is running application(s) 27 that request and receive the user's authorization without instructions or control from the financial institution systems 30.

As represented by block 630, the next step is to authenticate the user's identity before allowing access to the user computer system 20. In various embodiments, different authentication schemes are used. For example, depending on the level of security or access associated with the user computer system 20, different levels of authentication may be required. As discussed above with reference to FIGS. 4A-4D, different levels of authentication may be used depending on the associated level of access or security of the user computer system 20. For example, the user 4 may establish preferences that dictate that the user computer system 20 has a high level of security (e.g., $8/10$), in which case, a correspondingly high level of authentication may be required for granting access to the user computer system 20. In different circumstances, the user 4 may establish preferences that allow a lower level of authentication, for example, if the user 4 has recently authenticated his/her identity to the user computer system 20. Also, in some embodiments, no additional authentication is required. For example, in some cases, the user 4 has established preferences dictating that no authentication is required for the user computer system 20 to request and receive authorization from the user 4 to access the user computer system 20. Further, in some embodiments, once the user 4 has granted authorization for access (and authentication if required), the user computer system 20 does not subsequently request authorization (i.e., the user has "opted-in") and/or the user computer system 20 does not subsequently request authentication. In some cases, however, even if the user computer system 20 does not subsequently request authorization, the user computer system 20 does require authentication for certain (or all) levels of access.

In various embodiments, the user computer system 20 and/or the financial institution system 30 accesses one or more databases, datastores, lists, memories, cloud resources and/or the like in order to determine the applications 27 and/or devices 50 associated with the user, the user computer system 20 and/or the user network 2. The first of these various steps, as represented by block 640, is to access an application directory in order to determine the applications installed on the user computer system. The application directory may be stored locally on the user computer system 20 or remotely on one or more other systems such as the financial institution system 30. The application directory, in some embodiments, represents the applications that are already installed on the user computer system 20, that is, the applications that are available for use on the user computer system 20. The next step in this process is represented by block 650 and is to access one or more download caches in order to determine the applications downloaded on the user computer system 20. In some cases, the applications that have been downloaded are stored in a location in the memory, such as a download folder. These applications may be in the form of an executable file (e.g., *.exe file) or may be a link to a remote network location where an executable file may be downloaded or remotely accessed (i.e., executed). The last step in this process, as represented by block 660, is to access one or more cloud caches in order to determine applications associated with the user and/or the user computer system 20. For example, in some circumstances, a user may have selected an application for use on one or more of the user's devices 50. In some cases, the device(s) on which the application is downloaded and/or installed is different than the user computer system 20. In other cases, the user computer system has a "phantom" link to the application, and the application is executed or run from a remote location on the network 2. In any such case, embodiments of the invention may determine that the application has been selected by the user and it may determine the level of the connection with the user (e.g., on how many user devices is the application installed).

FIG. 7 illustrates a process flow for accessing the user computer system 20 to determine the devices 50 previously or currently connected with the user computer system 20 or user network according to embodiments of the invention. The first step, as represented by block 710 and similar to step 610, is to request authorization from the user 4 to access the user computer system 20 in order to determine the devices 50 that are or have connected with the user computer system 20. The next step, represented by block 720, is to receive authorization from the user 4 to access the user computer system 20 to determine the devices 50 that are or have connected with the user computer system 20. As discussed above with reference to steps 610 and 620, this interaction with the user 4 may take place in a variety of ways in different embodiments. For example, the request for authorization may be transmitted from the financial institution systems 30 to the user mobile device system 20 and the user mobile device systems 20 may then communicate the request to the user 4. Then, the user mobile device systems 20 can communicate back to the financial institution systems 30. In other embodiments, the user mobile device system 20 is running application(s) 27 that request and receive the user's authorization without instructions or control from the financial institution systems 30.

The next step, represented by block 730, is to authenticate the user's identity before allowing access to the user computer system 20. Similar to step 630 discussed above, in various embodiments, different authentication schemes are used. For example, depending on the level of security or access associated with the user computer system 20, different levels of authentication may be required. As discussed above with reference to FIGS. 4A-4D, different levels of authentication may be used depending on the associated level of access or security of the user computer system 20. For example, the user 4 may establish preferences that dictate that the user computer system 20 has a high level of security (e.g., 8/10), in which case, a correspondingly high level of authentication may be required for granting access to the user computer system 20. In different circumstances, the user 4 may establish preferences that allow a lower level of authentication, for example, if the user 4 has recently authenticated his/her identity to the user computer system 20. Also, in some embodiments, no additional authentication is required. For example, in some cases, the user 4 has established preferences dictating that no authentication is required for the user computer system 20 to request and receive authorization from the user 4 to access the user computer system 20. Further, in some embodiments, once the user 4 has granted authorization for access (and authentication if required), the user computer system 20 does not subsequently request authorization (i.e., the user has "opted-in") and/or the user computer system 20 does not subsequently request authentication. In some cases, however, even if the user computer system 20 does not subsequently request authorization, the user computer system 20 does require authentication for certain (or all) levels of access.

In various embodiments, the user computer system 20 and/or the financial institution system 30 accesses one or more databases, datastores, lists, memories, cloud resources and/or the like in order to determine the devices 50 associated with (e.g., the devices that are currently or have been previously connected with) the user computer system 50, other devices, and/or the user network 2. The first of these various steps, as represented by block 740, is to access a currently connected devices directory in order to determine the devices 50 currently connected with the user computer system 20. The next step, as represented by block 750, is to access a previously connected devices directory in order to determine the devices 50 previously connected with the user computer system 20. Finally, the last step, represented by block 760, is to access one or more cloud device directories in order to determine devices 50 previously or currently connected with the user 4, the user computer system 20 and/or a user network 2. The currently connected devices directory and/or the previously connected devices directory may be stored locally on the user computer system 20, another device, or remotely on one or more other systems such as the financial institution system 30. The currently connected devices directory and/or the previously connected devices directory, in some embodiments, represents the devices 50 that are currently connected or previously connected, respectively, with the user computer system 20, other device or the user network 2.

Additionally, it should be understood that a user 4 may have multiple user computer systems 20, or that the user computer systems 20 of multiple users may be accessed in order to determine the applications 27 and/or devices 50 that each of the users utilize. For example, the user 4 may have some applications 27 and/or devices 50 that the user 4 accesses through a mobile device system, while the user 4 may have additional applications 27 and/or devices 50 that the user 4 accesses through a tablet device system, and/or applications 27 and/or devices 50 accessed by both. Moreover, in other examples, multiple users may be able to access the same applications 27 and/or devices 50 through multiple user computer systems 50. As such, the present invention not only determines what applications 27 and/or devices 50 users access, or have accessed in the past, but how each of the users access the applications 27 and/or devices 50. This may be helping in performing the other aspects of the invention discussed throughout the specification.

FIG. 8 illustrates a process flow for categorizing the applications 27 and devices 50 to determine information about the user 4 and the applications 27 and/or devices 50 according to embodiments of the invention. The first step of the process, as represented by block 810, is to retrieve the list of applications downloaded, installed and/or associated with the user computer system 20. The next step, represented by block 820, is to retrieve the list of devices 50 previously or currently connected with the user computer system 20 and/or a user network 2.

The next step, represented by block 830, is to associate each of the applications 27 and/or devices 50 with one or more categories defined to indicate information about the user 4 of the user computer system 20. These categories may be or include, for example, one or more applications 27 associated with one or more of the devices 50 discussed with reference to FIG. 2 and/or FIG. 3, and/or other devices and/or other applications. As another example, the categories may be or include one or more applications such as financial institution applications, music/media applications, gaming applications, weather applications, navigation applications, social applications, utilities applications, food applications, retail applications, news applications, productivity applications, and/or other applications.

The next step, as represented by block 840, is to analyze the one or more categories to determine information about the user 4 of the user computer system 20. Finally, as represented by block 850, the last step is to analyze the one or more categories to determine information about the devices 50 previously or currently connected with the user computer system 20 and/or the user network. The number of members, type and other characteristics of the categories may be determined and maintained for analysis purposes. For example, a greater number of applications 27 and/or devices 50 in a particular category may indicate that the user has a high interest in that category. Conversely, if the user has a low number of applications 27 or devices 50 in a category, this may indicate the user has a low interest in a category. Further, if the system determines, through other data or information (such as from a social media application, online banking application or otherwise) that a user 4 is interested in an area but has no applications related to such an area, the system may provide a recommendation to the user 4. For example, if the system determines that the user is interested in financial industry news but the user does not have any news applications, then the system may identify an unmet opportunity for recommending a financial industry news application.

FIG. 9 illustrates a high level process flow 900, for configuration and device connectivity based on user selection, in accordance with one embodiment of the invention. It should be understood that the various steps of the process flow 900 may be conducted by a system, either singularly or in combination with steps from other embodiments described elsewhere in this disclosure, in any suitable order. Furthermore, "system" as used herein may refer to the link system 10, user computer system 20, financial institution system 30, third party systems 40 or any other system that conducts the process flow, either entirely or in part. Although, in some embodiments, the process flow 900 is conducted by the link system 10 in conjunction with the user computer system 20. It should be understood that "one or more" devices and "one or more" applications disclosed herein may also refer to a "plurality" of devices and a "plurality" of applications, respectively, and vice versa.

As illustrated by block 910, the system retrieves user information. The user information may comprise user activity information and user social media information. In some embodiments user activity information may comprise user contact information (home address, workplace, phone numbers and the like), rewards/loyalty programs and affiliations, fitness activities, relationships associated with entities like merchants, healthcare providers and the like. In some embodiments, user activity information may comprise the user's financial transactions like purchases, bill payments, financial transfers, insurance payments, accounts and payment instruments associated with the user 4 and the like. In some embodiments, the user 4 may provide at least a portion of the user information, while in other embodiments, the system may retrieve the information from suitable databases or memory locations based on receiving requisite credentials/permissions from the user 4. In some embodiments, the user information may comprise social media information, for example, information associated with the user's social media accounts, online posts, likes, preferences and comments. In some embodiments, the system may automatically determine one or more interests of the user 4, one or more targets of the user 4 and/or one or more applications 27 and devices 50 associated with the user based on analyzing the user information in conjunction with other relevant data like audio/video feeds of the user device, user's appointment calendars, the user's location, information associated with the user's peers or other customers similar to the user 4, and the like. For example, based on analyzing the user's transactions, the system may determine that the user performed one or more transactions using certain applications 27. The system may then determine that the user 4 is currently or previously has been associated with the applications 27 used to conduct the transactions and may then identify the devices 50 associated with the applications 27 (user devices where the applications are stored, other devices that the applications can control and the like), frequency of transactions with applications 27, entities associated with the applications 27 and the like.

The process flow 900 represents determining one or more applications 27 associated with the user 4, at block 920. In some embodiments the system determines a plurality of applications associated with the user 4. In this regard, the system may retrieve application information from the user devices 50, via the established operative communication channels. Application information may comprise lists of one or more applications or widgets stored on the user's various devices, locations of the one or more applications, devices that the applications are coupled to, or are configured to be connected with, entities associated with the application, user's activity history associated with the applications, or the like. In some embodiments, the user 4 may provide at least a portion of the application information, while in other embodiments, the system may retrieve the application information from memory locations on the user devices 50 or relevant entity databases based on receiving requisite credentials/permissions from the user 4. For instance, the system may determine a first device of the user 4, and an application A that controls a device D1, for example, a lighting feature in the user's home. The system may further determine that the application A may be further configured to control another device D2, for example, a thermostat or a security system associated with the user's home or workplace. As another example, the system may determine that a second user device, different from the first device and without the link application, comprises applications associated with one or more entities like the user's financial institution, healthcare provider, a merchant, or the like, or applications coupled to devices like an application monitoring the fuel levels or charge level of the user's automobile. As another example, the application may be the operating system of the user's tablet computer, controlling the built-in camera or GPS device in the tablet computer, or a software program associated with the user's desktop computer configured to communicate with a printer. In this regard, the system may link the one or more user computing systems 20 and devices 50 together and/or to the system, by establishing communication channels for information transfer. In some embodiments, the information transfer may be one-time, for example, the system may request the user 4 to turn on the devices 50, connect them to a network 2 and/or place them at a predetermined proximity for a certain time. In this regard, the system may store at least a portion of retrieved information at a centralized repository, memory location or database for ease of access. In other embodiments, the information transfer may be periodic for determining current information in real time. For example, the system may transmit control signals to a device 50, for example signals via a text message to a device 50 that is offline, that cause the device 50 to connect to a network 2 for real time information transfer, or that cause the device 50 to turn on from a suspended state.

The system may further determine one or more devices 50 associated with the user, as illustrated by block 930. In some embodiments the system determines a plurality of devices associated with the user 4. In this regard, the system may analyze the user information and the user application information to determine one or more devices associated with the user as described above. For example, the system may determine that the user 4 owns a bicycle based on analyzing photos uploaded by the user 4 on social media. As another example, the system may determine that the user utilizes a wearable device to monitor physical activity parameters, based on identifying an application stored on a user device in communication with the wearable device. In some embodiments, "device" may refer to combinations of applications and devices that are related to one another (e.g., the application controls the device or multiple devices). Based on identifying the applications 27 and devices 50 associated with the user 4, the system may present a link application device detection dashboard 1500 on the interactive integrated interface of the link application 17. FIG. 15, as discussed in further detail below, illustrates a link application device detection and connection dashboard displayed on an interactive integrated interface in accordance with one embodiment of the invention.

The process flow 900 may further comprise determining one or more targets or goals associated with the user 4 based on the determined applications 27 and devices 50, user information, and application information, as illustrated by block 940 of FIG. 9. In some embodiments, the system determines one or more targets being configured to be completed by modifying the one or more control factors associated with the one or more devices 50, as described in detail elsewhere in the application. In this regard, in some embodiments, the system may identify patterns of user interaction with one or more applications and/or one or more user devices 50 based on analyzing the user activity information. The system may then identify one or more targets of the user 4 based on this analysis. For example, the system may determine that the in the past few days the user has been viewing information associated with courses/programs associated with certain universities. The system may then determine that higher education may be one of the user's targets. The system may provide the user with periodic alerts regarding application deadlines, latest rankings, course information, study material for admission tests and the like to aid the user in achieving the target, as well as provide information related to how the user 4 may utilize applications 27 and/or devices 50 to save funds for education related costs.

As another example, the system may analyze the user's appointment calendar and identify an interview appointment for a job opportunity, thus the system may identify employment as a target. After determining the target, the system may then identify target devices that may help the user achieve the target and control factors that need to be modified in order to achieve the target. In this regard, for example, the system may identify lighting/speaker devices (control factors comprising illumination, volume, music and the like) in the user's home, user's computing devices (control factors comprising display of information, alarm/notification features and the like), and navigation devices in the user's car (control factors comprising GPS coordinates, route for travel, directions and the like). The system may then identify associated applications that are configured to modify the control factors, for example, an application stored on a user device configured to change illumination, or an application associated with the user's subscription to a news entity. In this regard, the system may control the one or more devices via the application. Although in some embodiments, the system may transmit control signals to the devices directly, without establishing a communication channel via an associated application. The system may then enable the user 4 to achieve the target by transmitting control signals to lighting or speaker devices on the user's home to cause them to flicker, play certain music, change illumination and/or volume to remind the user about the interview at a predetermined time. Also, the system may retrieve, compile and transmit information associated with the job opportunity, the employer, position requirements, latest news about the company/firm and the like to the user's computing device by accessing relevant databases. Furthermore, the system may then transmit control signals to a navigation device in the user's car to display a determined optimal route for travel to the interview location and/or dynamically monitor traffic patterns, weather and the like and dynamically modify the route for minimum travel time.

In some embodiments, the system may determine user preferences based on analyzing user comments associated with the user social media information and determine the one or more targets/goals associated with the user based on at least the patterns of user interaction and the user preferences. The system may determine one or more devices that the user has previously used and/or one or more applications installed on user devices, and further determine the user's preferences based on frequency of use, most recent activity, type of activity (online or in-store), user's social media information and the like. The system may analyze the user's activities and determine the preferred user devices for each activity. As another example, the system may analyze the content of the user's social media posts or comments and determine that the user seeks to take a vacation. In this regard, the system may aid the user 4 in achieving the target of a vacation by managing the itinerary, enabling purchase of flight tickets and dynamic tracking of arrival and departure times, providing language translation services, monitoring the user's location and providing local maps and the like. In this regard, the system may control one or more applications and devices of the user 4 to achieve the target.

In some embodiments, the system may determine one or more broad interests of the user 4 and one or more goals/targets of the user 4. As an example, the system may analyze the user information and determine that the user 4 purchased fitness equipment or determine that the user 4 runs every day based on information retrieved from the fitness monitoring devices of the user 4. Consequently, the system may determine that improving health may be a broad interest associated with the user 4. Similarly, the system may determine that saving for retirement may be an interest of the user 4 based on information associated with the user's peers that are similar to the user 4. The system may then determine that opening savings accounts or investments in stocks may be goals/targets of the user 4. As another example, the system may determine that the user 4 seeks to take a vacation based on the user's search history. The system may then initiate presentation of a link application interest determination dashboard 1600 on the interactive integrated interface, as discussed below with reference to FIG. 16.

Continuing with FIG. 9, the system may determine one or more targets associated with the user 4 at block 940, in some embodiments, based on the user's prior selection of the interests and targets. These determined targets may be more specific in nature and configured to implement the user selected interests and broad targets/goals. The system may determine one or more target categories based on analyzing the application information and the user information and determine one or more targets for each category. In some embodiments, the one or more targets are configured to be completed by modifying the one or more control factors associated with the one or more devices 50. In some embodiments, the system determines one or more target attributes associated with the one or more targets. The target attributes may comprise a target time period, optimal values of target benefits, optimal values of the one or more control factors and the like. The optimal values of the one or more control factors may be active (for example, periodic control, control based on feedback and the like) or passive (for example, based on a set predetermined value).

In some embodiments, the system may determine one or more targets based on determining the locations of one or more identified devices 50. The locations the devices 50 may be fixed for stationary devices like air conditioning systems, alarm sensors, printers, stoves, refrigerators, or variable for devices like cars, wearable devices, cameras and the like. In this regard, the system may compare the device location to that of the target location. The target location may similarly be variable when the target is configured to be achieved at/from multiple locations or fixed when the target is associated with one or a group of fixed locations. In this regard, the system may identify one or more devices 50 at a first location. The system may then determine a target suitable for the first location. For example, the system may analyze application information and device information and determine that the user's home (e.g., device location) has heating/cooling devices, illumination and lighting devices. The system may then determine a target of lowering utility bills at the user's home (e.g., target location) based on identifying one or more devices in the user's home. As another example, the system may determine that the user 4 utilizes a GPS device (e.g., variable device location) and that the user's mobile device comprises a coupon application. The system may then determine a target (e.g., variable target location) of savings on purchases both online and in-store. In this regard the system may monitor the user's location via the GPS device and retrieve and/or automatically apply relevant coupons to purchase transactions based on determining that the user 4 is proximate a transaction terminal/proximate a merchant location.

In some embodiments, after determination of the one or more targets, the system may then identify/determine a plurality of target devices, such that the one or more targets may be completed by at least modifying the one or more control factors associated with the plurality of target devices. In some embodiments, the plurality of target devices are selected from a group of devices determined previously, while in other embodiments, at least one device of the plurality of target devices is distinct from the devices determined previously. In some embodiments, the plurality of target devices are determined based on comparing the target attributes with the control factors of the devices. In this regard, the system may determine one or more control factors for each of the determined devices. For example, the system may determine that device A has control factors 1, 2 and 3, device B is associated with control factors 2, 4, 5 and 6 and device C is associated with control factor 3. The system may identify a target associated with target attributes comprising optimal values of control factors 1 and 3, such that the target may be achieved, at least in part, by at least modifying the control factors 3 and 7 on one or more devices. These control factors associated with the target attributes are also referred to as target control factors. The system may then compare one or more target control factors with the one or more control factors associated with each of the plurality of devices and determine the plurality of target devices, based on at least determining that at least one control factor associated with each of the plurality of target devices is the same as the one or more target control factors. For example, the system may determine devices A and C as target devices since A is associated with both the target control factors and since device C is associated with at least one target control factor. However, device B not having at least one common target control factor, may be deemed unsuitable since the device B may not be controlled to achieve the optimal values of the target control factors 3 and 7 required for the completion of the target at least in part.

In some embodiments, the system may either determine the plurality of target devices based on comparing the target location with the device location. Continuing with the example of providing savings on utilities, the system may determine that the user 4 may save an increased second amount if other electronic devices 50 in the user's home were controlled. In this regard, the system may identify only the devices 50 associated with the user's home as target devices since devices 50 at other locations may not aid the target of lowering utility bills at the user's home. As another example, a health target may comprise monitoring control factors like the user's pulse/heartbeat, movement comprising number of steps, elevation of path and the like, throughout the day. Therefore, the target location of the health target may be variable. The system may then identify portable target devices with variable locations that are configured to measure the control factors. The system may also disregard stationary devices or devices that are cumbersome to carry and transport. In other embodiments, the system may dynamically establish connections with target devices based on use. Continuing with the above example, the system may monitor the control factors via a wearable fitness device/or a smart phone when the user 4 is away from home and monitor the control factors via a stationary device (for example, a treadmill) based on determining that the user 4 is utilizing/is proximate/or to the target device.

The functioning of the target, control factors and attributes are explained with the previous example of a target of lowering utility bills associated with heating/cooling devices, illumination and lighting devices and other electronic devices. The system may determine that the user 4 will save a first amount (e.g., target benefit value) on the utility bill if the control factors of the devices are modified, for example, automatically and in real time, setting the desired temperature/illumination (e.g., direct control factors associated with the devices) based on determining temperatures outside the home/ambient light, detecting presence of one or more users, automatically turning the devices on/off based on outside temperatures, enabling the user 4 to control the multiple devices away from home and the like. For example, the system/the user may determine that the target must be active for a predetermined target time period, for example, during certain summer/winter months, or recurring for a certain number of weekdays at a predetermined time periods. In some embodiments, the user 4 or the system may determine an optimal value of target benefit, for example, savings of the first amount in a period of 30 days and determine other target attributes required to achieve the set value. In addition the system may determine one or more devices and/or additional devices that may aid in the target based on the device location, desired target attributes, user input and the like.

In some embodiments, the system may determine one or more target categories based on analyzing the application information and the user information. The system may then initiate presentation of a link application category configuration dashboard 1700, as discussed further below with reference to FIG. 17 and receive a selection of a target category. The system may then determine targets based on the user selection of the target category. The target categories may comprise savings targets, investing targets, earning targets, management targets, improvement targets, protection targets, other miscellaneous/suggested targets and the like. The savings targets category may comprise one or more targets that provide savings benefits to the user, for example, savings on utility bills, savings on purchases, savings on insurance, savings on fuel and savings with respect to water consumption. The investment targets category may comprise one or more targets that help/benefit the user with respect to initiating and monitoring investments, savings, assets and the like. The earnings targets category may comprise one or more targets enable the user 4 to earn new, additional or increased benefits, for example, earning rewards based on user activities/transactions, earning loyalty points, earning points on achieving fitness goals and the like. The management targets may benefit the user 4 by enabling convenient, centralized and real time management of a plurality of devices 50, management of finances and budgeting, management of appointments, management of one or more automobiles and the like. The protection targets may help the user 4 protect and ensure the safety of one or more assets, for example, targets related to monitoring possession of one or more devices 50, targets related to fire detection and control (for example, sprinklers), targets directed to detection of intruders and the like. The system may categorize/determine the one or more targets based on identifying, for each target of the one or more targets, a target benefit associated with the at least one selected target category, as described above. For example, if the user 50 chooses a savings category, the system may determine targets which provide savings benefits. In some embodiments, the system may determine a plurality of targets under each category and populate the interface 1700 with the pre-determined targets, while in other embodiments, the system may determine the targets after receiving a selection of a category. The system may then display the determined targets and the associated category on the interface 1700. Based on the user choice of a target in the link application category configuration dashboard 1700, the system may initiate the presentation of one or more targets on a link application target configuration and device connectivity dashboard 1800, displayed on an interactive integrated interface, as discussed further below with reference to FIG. 18. FIG. 19, as discussed in further detail below, illustrates the link application target configuration and device connectivity dashboard 1900, displayed on the interactive integrated interface in accordance with another embodiment of the invention.

Referring back to FIG. 9, block 950 illustrates receiving, via the interactive integrated interface, a user selection of at least one target of the one or more targets, the at least one target being associated with at least one device of the one or more devices 50. The user 4 may select the at least one target via the target interfaces described above. In some embodiments, selecting at least one target comprises providing authentication credentials for the one or more associated applications. In some embodiments, the system determines a plurality of target devices having control factors, that when modified cause at least the partial completion of the at least one target. The determination of the plurality of target devices associated with the at least one target may be substantially similar to the determination of the plurality of target applications related to one or more targets described previously.

FIG. 10 illustrates a high level process flow 1000, for device connectivity and device control based on user selection, in accordance with one embodiment of the invention. In this regard the system provides a comprehensive integrated platform for device discovery, active device control and target configuration. The system enables communication, management and control of remote and/or otherwise incompatible devices 50 through a single integrated interface. Block 1010 illustrates establishing a communication link between the system (e.g., through the link application 17) with the at least one device 50 and/or the at least one associated application 27 (e.g., application that accessed the device). In some embodiments the system establishes a communication link with a plurality of target devices and/or a plurality of target applications associated with the selected at least one target. In some embodiments, establishing the communication link comprises linking the link application 17 with the at least one device and the at least one associated application, by receiving requisite authorization from the user 4. In this regard, the system may initiate, a presentation of an authentication interface in response to receiving user selection of at least one target. The user 4 may then provide one or more authentication credentials associated with the at least one associated application through the interface. The system (e.g., through the link application 17) may then gain access to the applications 27 based on successful validation of the one or more authentication credentials. In this regard, in some embodiments, the system may provide the credentials to the application associated with the user device or transmit the received credentials to the entity system associated with the application and/or device and receive confirmation of validation. In some embodiments, the system (e.g., through the link application 17) may validate the one or more authentication credentials by comparing the credentials to credentials retrieved from a storage location associated with the at least one associated application. The validation of credentials may then enable the system to control the at least one device and/or the at least one associated application by modifying the one or more control factors. It should be understood that in one embodiment the control factors may be controlled directly through a centralized location within the link application 17. In another embodiment the link application 17 may display an interface of the application that controls the device 50 directly in the link application 17 (e.g., so that the user 4 does not have to separately access the application that controls the device 50). In still another embodiment, the link application 17 may have an interface that is manipulated to have the look and feel of the application that controls the device 50, but may be run through the link application 17, without having to be directed or sent into the application associated with the device 50.

The system may then transmit, via the established communication link, control instructions to the at least one associated application of the at least one device to configure the at least one associated application to provide information and feedback related to the one or more control factors associated with the at least one device at block 1020. For example, the system may configure a wearable device to provide the heart rate of the user at periodic intervals for a health monitoring target. In this regard the system may transmit control instructions such that the receiving application/device may recognize and decode the instructions. In some embodiments, the system may execute dynamic control of the application based on received feedback from the device/application. For instance, the system may receive current values of the one or more control factors from one or more devices associated with the target. The system may then compare the received current values of the one or more control factors and the optimal values of the one or more control factors associated with the target attributes. The system may then transmit modified control instructions to the at least one device, the modified control instructions configured to control the at least one device based on the received feedback. For example, if the current value is lesser than a desired value, the system (e.g., through the link application 17) may modify control signals that cause the value of the control factor to increase to the desired value either instantaneously/within a predetermined period of time. The system may then notify the user regarding the change in control instructions. The notification may be in any suitable form. In some embodiments, the system causes the link application, either offline or running in the background, to display an interface with the modified control instructions and the completion status of the target.

Next, at block 1030, the system may initiate a presentation of a target interface for display on the user computer system 20, the target interface comprising the at least one target, one or more target attributes associated with the at least one target, the at least one device, the at least one associated application and the one or more control factors, wherein the target interface enables the user 4 to modify at least one target attribute. This target interface may be substantially similar to the interfaces described in FIGS. 18 and 19. In some embodiments, the system may receive, user input comprising one or more additional devices 50 and/or one or more additional applications 27 associated with the at least one target. In some embodiments, the system may enable the user 4 to modify at least one target attribute associated with the at least one target. In this regard, the system may then determine new values for the attributes not modified by the user 4 and update their values on the interface. For example, if the user modifies, a time period or the amount of monthly transfers to a savings/investment account, associated with a savings target, the system may determine new values for the final savings amount likely to be obtained at the end of the target period. As another example, the user 4 may add an additional device to a current target. The system may then determine changes in control factors of the existing devices for the new device to achieve the target together. The system (e.g., through the link application 17) may then transmit, modified control instructions to the at least one device and the one or more additional devices. The modified control instructions are configured to control the devices by modifying the associated control factors to obtain the modified target attributes and the updated target attributes. In this regard, the system may determine values of control factors required to achieve the updated attributes and transmit control instructions that modify the control factors of the devices (e.g., by increasing/decreasing values, switching on/off, retrieving/displaying data and the like). As described above, the system may transmit control instructions to the at least one device, the control instructions configured to control the at least one device by modifying the one or more control factors in accordance with the one or more target attributes, whereby the control instructions enable active, real-time control of the at least one device and the at least one associated application for monitoring and completing the at least one target via the target interface at block 1040.

FIG. 11 illustrates a process flow for active configuration of devices based on user selection 1100, in accordance with an embodiment of the information. The active configuration described herein provides the functional benefit of monitoring the user's progress towards achieving the target and determines suggestions, such as one or more additional devices and/or additional applications determined to aid the user in achieving the target. As shown in block 1110, the process flow includes determining one or more additional devices 50 and/or one or more additional applications 27 that could be associated with the user 4 in order to aid in reaching the target. In some embodiments, the additional devices 50 determined may not be currently connected to or have been connected to the user computer system 20 in the past. For example, in order to meet the user's "improve" target under the "health" target category, the system may determine one or more activity tracking devices for monitoring and tracking fitness-related metrics such as distance walked or run, calorie consumption, and in some cases heartbeat and quality of sleep. In doing so, the system may determine that the additional devices 50, when combined with the one or more devices already connected to the user computer system 20, aids the user 4 to accomplish the target. In some other embodiments, the additional applications may not be currently stored or have previously been stored on the user computer system 20 (or accessed by the user computer system 20) in the past. Continuing with the previous example, the system may determine one or more activity tracking applications for monitoring and tracking the user's daily progress. In this regard, the user 4 may have to manually enter information into the application to maintain a log of the user's progress. In doing so, the system may determine that the activity tracking devices aid the user 4 in efficiently monitoring the user's health and aid the user in improving his/her health, and thus, aid in reaching the "health" target. In some embodiments, the additional devices 50 are associated with applications 27 that may be used to modify one or more control factors of the additional devices 50. In other embodiments, the additional devices 50 may be stand-alone devices configured to operate independently of an application, or along with an application 27 that the user 4 currently uses. In still other embodiments, the additional applications 27 may be stand-alone applications 27 stored in the user computer system 20 (or accessed by the user computer system 20) that may be used to monitor the user's progress either based on manual input from the user 4 or using one or more devices (e.g., gyroscope, accelerometer, or the like) already part of the user computer system 20. Moreover, all of these devices 50 and/or applications 27 may be controlled in a central location through the link application 17.

In response, the system (e.g., through the link application 17) may establish a communication link with the user device and/or associated application. In this regard, the system may be configured to establish a bi-directional communication link with the user device and/or application, thereby creating a data channel for transmission of data between the system (e.g., the link application 17) and the user device. In doing so, the process flow then initiates, via the data channel, a presentation of the additional devices and/or the additional applications on a user interface for display on the user computer system 20, as shown in block 1120. In some embodiments, the presentation of the user interface may activate the target application stored on the user computer system 20 causing the user interface to be displayed on the user computer system 20. These additional devices and/or the additional applications may be presented as devices and applications already associated with the user. In this regard, the system may be configured to search for devices 50 and applications 27 currently connected to the network 2 associated with the user computer system 20. In another embodiment, the system may be configured to identify one or more additional devices 50 and/or applications 27 that are not currently connected to the network 2 associated with the user computer system 20 and recommend the use of these devices 50 and applications 27 to achieve a target.

Next, as shown in block 1130, the process flow includes receiving via the user interface, a user selection of at least one of the one or more additional devices 50 and/or additional applications 27. In response to receiving a user selection, the system may request one or more authentication credentials from the user 2. The authentication request typically includes device information associated with the user computer system 20, user devices 50, user applications 27, user information associated with the user, and/or user's online banking account. The device information may be any information sufficient to generate a device "fingerprint", or a unique signature of the user computer system 20, user devices, and/or user applications. The user information may be any information sufficient to identify the user 4 and/or the user's online banking account. In some embodiments, the user information may include, but is not limited to, at least one of a username, contact information, a password, a PIN number, biometric information (e.g., physiological features such as fingerprints, finger vein and palm vein patterns, as well as iris and facial recognition to verify individual identities), a unique identification number associated with the user, social network information, an account number, or a card number. In some embodiments, the user information may be proprietary to the financial institution, such as an account number, a reference number to an account, a client number, or the like. In other embodiments, the user information may be public information, such as a phone number, mailing address, email address, or the like.

In some embodiments, the system may be configured to request individual authentication credentials for each additional device 50 and/or application 27. In another embodiment, the system may be configured to request a single set of authentication credentials for all the additional devices 50 and/or applications 27 selected by the user. In yet another embodiment, the system may be configured to request a set of authentication credentials for the devices 50 and/or applications 27 currently connected to the network 2 associated with the user computer system 20 and another set of authentication credentials for the additional devices 50 and/or applications 27 suggested to the user.

In response to receiving the authentication credentials, the system may process the authentication credentials for validation. In a typical example, the authentication credentials provided by the user 4 are compared with one or more authentication credentials previously stored in a database. The system may then determine a match between the one or more authentication credentials received from the user 4 with the one or more authentication credentials stored in the database, thereby authorizing the user 4 to access at least a portion of the additional devices 50 and/or the applications 27. In response to a successful authentication of the authentication credentials, the system may then be configured to access at least a portion of the additional devices 50 and/or the applications 17 selected by the user 4. In some embodiments, the system may be configured to access the additional devices 50 and/or the applications 27, thereby enabling the modification of at least one control factor associated with each of the additional devices 50 and/or the applications 17 selected by the user 4. For example, for an additional device such as a smart thermostat, enabling the system to access to the smart thermostat may include allowing the system to modify one or more control factors of the thermostat such as temperature regulation, programming schedule, or the like.

Next, as shown in block 1140, the process flow includes linking the one or more additional devices 50 and the one or more additional applications 27 selected by the user 4. In some embodiments, the system (e.g., through the link application 17) may be configured to initiate a presentation of an access interface including one or more features of the additional devices 50 and/or the applications 27 selected by the user 4. The user 4 may then have to select one or more features for each of the additional devices 50 and/or applications 27 previously selected by the user 4. In this way, the user 4 may allow the system (e.g., through the link application 17) to access one or more features of each additional device 50 and/or application 27. Accessing the one or more features of the devices 50 and/or applications 27 may require the user 4 to provide one or more authentication credentials in accordance with the authentication continuum, described herein.

FIG. 12 illustrates how the data is aggregated from the devices 50 and/or applications 27 in order to determine the user's progress in reaching the target. As illustrated by block 1210 in FIG. 12, the system accesses the linked applications 27 (e.g., as previously discussed, the applications 27 may not be specifically associated with devices 50 and/or may be specifically associated with devices 50) associated with the target, for example through an electronic link with the applications as previously discussed. In some embodiments, this may include accessing a linked device 1, device 2, application 3, device 4, application 5, and device 6, if these applications and devices were linked with the link application 17 of the present system, as previously discussed and as illustrated and discussed with respect to FIGS. 15-19. For example, in some embodiments as previously discussed, the target may be saving money from energy use within the user's home (e.g., which is one type of target within a "save" category). In such examples, the system may access information coming from a smart thermostat, from smart outlets, from smart power meter (e.g., attached to appliances such as a furnace, heat pump, a/c unit, or the like to determine power usage of individual devices), from a power application (e.g., an application that pulls information from electric, gas bills, and other related energy bills), and from mobile devices of the users 4 (e.g., people living in the house) that tracks the movement of the users, or any other type of application related to energy use.

As previously discussed, the system may access these applications (e.g., stand-alone applications and/or applications that control a device) by the user 4 providing login and password information to the link application 17, by providing information to access the device 50 (e.g., device identifier), by communicating with the devices, by receiving information from third-parties directly (e.g., a power company), or the like.

As illustrated by block 1220 in FIG. 12, the system captures application information (e.g., information from stand-alone applications and/or applications associated with a device) from the linked applications 27 and/or associated devices 50. The application information may be data from applications 27 and/or devices 50 with which the system communicates. For example, continuing with the example from block 1210, the system may capture settings of the user's thermostat related to what temperatures the user 4 sets on the thermostat over time, the outside temperature during the course of a day, the amount of power the heating/ac units utilize, the amount of power being used from the smart outlets and the times of use, the amount of power the house uses in total and the amount charged for such power based on capturing information from utility bills, the times of day when the users 4 are home or away from the house during different days and times of day, and/or the like.

Block 1230 in FIG. 12 illustrates that the system transforms the application information captured from the various applications (e.g., stand-alone applications and/or applications associated with devices) into target information for the users 4. The target information may include the original application information, application information that has been converted into different types of data, or combining the application information to create useable target information. For example, continuing with the example illustrated in block 1220 the system transforms the smart thermostat temperature setting, outside temperature readings, power cost from utility bills, and power input into the furnace/ac into a determination of the price of turning up or down the temperature per degree. In other embodiments this transformed target information may be made based on, or supplemented with, average costs based on location changes and varying prices. Continuing with the example, the information captured from the smart outlets may be transformed into a price of having individual smart outlets turned on or off using the same type of power consumption information.

As illustrated by block 1240 in FIG. 12, the system (e.g., through the link application 17) may then aggregate the target information captured and transformed from the applications (e.g., applications and/or applications associated with a specific device) into aggregated target information, such as tallying costs of using energy, savings currently being saved based on previous costs, discounts utilized by the user 4, consumption information (e.g., kph used, or the like), user time utilizing an application and/or device, or the like for future presentation to a user 4. Continuing with the energy related example, the target information related to energy consumption is aggregated by tallying the prices, costs, and savings associated with the applications (e.g., the stand-alone applications 27 and/or applications 27 associated with devices 50) related to the target information captured from the applications 27.

As illustrated by block 1250, the aggregated target information and/or the target information for each application (with or without an associated device) may be presented to the user in a target interface. For example, FIGS. 18-19 may illustrate interfaces in one embodiment for presenting the aggregated target information to illustrate what the user 4 is currently doing with respect to the target on a total overall basis. Additionally, the individual target information for each of the applications 27 and/or devices 50 may be displayed to further illustrate what the user 4 is doing on an individual application 27 and/or device 50 basis. For example, continuing with the example discussed with respect to FIG. 12, the target interface may illustrate how much energy the user is utilizing and the associated cost in total, and how much different appliances (e.g., furnace, ac, outlets, or the like) are contributing to the total energy consumption and cost.

Block 1260 illustrates that based at least in part on the aggregated data, the system determines the target progress already achieved by the user 4 and/or target suggestions to aid in reaching the target as a whole and/or for individual applications 27 (e.g., the applications 27 that may or may not have an associated device 50). For example, continuing with the example described with respect to FIG. 12, the system may illustrate that when compared with historical costs the user 4 has reduced costs and reached 80% of the target (e.g., month over month, the same month a year ago, or the like). This may be achieved, for example by the system determining when the users 4 are not located in the home, determining when it is night and the users 4 are asleep, determining changes in temperature, and in response changing the temperature settings and/or turning off the outlets during the day when users 4 are not at home and at night when the users 4 are asleep. In addition to, or alternatively, the system may suggest the user 4 allows the system to control more of the applications 27 and the user 4 can save an additional 20%, or the like to reach the target. For example, the system may suggest that the user 4 should utilize and/or purchase smart devices for TVs or water heaters in order to control use of TVs and/or reduce temperature of water heaters during off-peak times (e.g., at night) in order to save additional funds. In another example, the system may be aware that if the user 4 has the power bill automatically deducted from the user account, the user can save an additional 1% on the bill (e.g., this is an example of a potential savings that is unrelated to a particular device and instead is related to only an application). In this this way, the savings that the user 4 has already achieved, or would achieve in the future if the user 4 undertakes the target suggestions, is determined.

Block 1270 illustrates that the target progress and/or status, and/or the target suggestions are displayed to the user 4 in the target interface. FIGS. 18 and 19, illustrate simple examples of how the target progress and/or status, the target suggestions, and/or configurations for the target in order to allow the user 4 to modify the control of the applications 27, may be displayed to, or utilized by, the user 4. Continuing with the example, by allowing the system to control the energy related applications, as described above, the user 4 has met 80% of the user's savings target. Additionally, the system has provided additional target suggestions, such as reducing the temperature in the house at all times one (1) degree, controlling use of additional outlets, turning off TVs remotely and/or removing a TV from one of the rooms, taking advantage of bill savings offered by the utility companies, or the like, may reduce energy usage and aid in reaching the target.

As illustrated in block 1280, the user 4 is able to edit, add, delete, or the like, the control the system has over the applications in order to achieve the user target. This concept of changing the control over the applications may be discussed in further detail with respect to FIG. 13.

In other examples, the target may be a different type of target and the system accesses the applications and/or devices that aid in reaching the other types of targets. For example, the user 4 may be trying to save for a trip, and thus, the applications 27 accessed may be applications 27 specifically related to travel miles, travel rewards, discounts on travel, but may further relate to any applications 27 and/or devices 50 that the user 4 may utilize to save money to allocate funds to a travel target. For example, the savings from energy related devices may be allocated to travel. With respect to the travel target, the application information may include how many miles and/or other travel rewards the user 4 has accumulated, discounts available to the user 4 and when is the best time to purchase (e.g., cheapest, most flexible, or the like), and information from applications 27 and/or devices 50 that may help to save money for travel. This application information may be transformed into target information related to a cost that can be saved from each of the applications 27. The target information from the applications 27 are aggregated and presented to the user 4. In addition, a determination of the travel savings progress is determined from the aggregated target information, such as the amount saved based on the original cost, how much the user 4 has allocated to the travel, and the additional amount of savings needed to reach the travel target. The allocation of funds and/or the utilization of applications 27 and/or devices 50 may be controlled automatically by the system to aid in reaching the travel target.

Another example of a target may be a wealth management target, which allows the system to access different user accounts to use funds to transfer between accounts, buy or sell investments, pay down debt, or the like. The application information accessed may include interest rates for debts, rates of return on different assets, account balances, investment allocation, or the like between various accounts. This application information may be transformed into target information, such as market value of assets, actual rates of returns, outgoing payments broken down by principle and interest. The target information may be aggregated and presented to the user 4 to illustrate the real rates of return that the user 4 is realizing. The system may provide target suggestions to improve the user's rate of return, such as using available cash to pay off high interest rate loans, and using lines of credit as emergency funds. The changes in the user's wealth management may be monitored, and target progress or status may be presented to the user along with the target suggestions. The user 4 may allow the system to automatically utilize the user's funds to take particular actions, such as paying down debt, increasing rates of return, or the like.

In still other embodiments the target may be improving health, which allows the system to access wearable devices, smart exercise machinery, exercise applications, food consumption applications, or the like related to improving a user's health. The application information may be exercise time, exercise stress, health monitoring (e.g., heart rate, or the like), equipment used, different mussels exercised, types of exercises performed, amount spent on food and/or exercise related expenses (e.g., gym membership, equipment purchases, or the like). The application information may be transformed into target information that can be utilized to illustrate costs of exercise, costs of healthy eating, time spend exercising different groups of muscles, time spent on health related activities (e.g., going to or from exercise, spending on health related websites, or the like). The aggregated target information may be utilized in order to determine the user's progress to meeting the target related to costs of healthy living, time spent exercising, time spent on health related activities, or the like, and the information related to the target is presented to the user 4. The user 4 may allow the system to automatically control aspects of the user's applications 27 and/or associated devices 50 to achieve the health related target, as discussed throughout this specification.

It should be understood that in order to achieve the desired target the system may automatically control various applications 27 (e.g., stand-alone applications 27 or applications 27 that control devices 50) in order to help to automatically aid in reaching the target. This may include making changes to features of the devices 50 (e.g., changing settings on devices, turning devices on or off, or the like) and/or making changes within application (e.g., automatically signing up for or accepting deals, transferring funds between account to funds targets and/or improve rates of return, or the like). The control of applications 27 and/or devices 50 is discussed below in further detail with respect to FIG. 13.

FIG. 13 illustrates a process flow for active selection configuration system with suggested actions 1300, in accordance with an embodiment of the invention. As shown in block 1310, the process flow includes determining one or more devices 50 associated with the user 4 and/or one or more applications 27 stored on the user computer systems 20. In some embodiments, the system (e.g., through the link application 17) may be configured to establish a communication link with the user computer system 20, and one or more applications 27 and or the one or more devices 50 associated with the user computer system 20. As such, the system may access the user computer system 20, via the data channel, to determine one or more applications 27 and/or devices 50 associated with the user computer system 20.

Next, as shown in block 1320, the process flow includes initiating a presentation of a target interface comprising one or more target categories associated with the one or more target categories for user selection. As described herein, the target interface illustrates different types of targets that the user 4 may be interested in based on the applications 27 and/or devices 50 that the user utilizes, have utilized in the past, or may utilize in the future (e.g., if the user decides to download the application in the future, or the like). The targets may be presented in the form of cards that illustrate information about each of the targets, such as but not limited to if a connection is made between the link application 17 and the applications 27 and/or devices 50, account balance information for the user accounts, monthly budget information related to the applications 27 and/or devices 50, and control and monitoring information related to the applications 27 and/or devices 50.

In response, the process flow includes receiving a user selection of a target category and a target associated with the target category as shown in block 1330. Following a selection of a target by a user, the system configures the applications 27, devices 50, and the like associated with the user 4 to provide information and feedback associated with the selected target to the user 4 in a target interface. For example, once the user 4 selects a target card, the system monitors the target, interacts with any applications 27 and/or devices 50 used to meet the target. Next, as shown in block 1340, the process flow includes initiating a presentation of a control interface comprising one or more features associated with the one or more devices. As previously discussed the control interface, may be an interface unique to the link application 17, may be linked to the interface related to the application 27 and/or device 50 being controlled, or may be a representation of the interface related to the application 27 and/or device 50 being controlled, but is provided by the link application 17. For example, if the device is a smart thermostat, the features provided in the control interface may include temperature control, programming schedule, or the like. In another example, if the device is an activity monitoring device, the features may include gait monitoring, alarm settings, calorie counter, or the like. In yet another example, if the device is an uninterrupted backup power supply for a home, the features may include switching between the power grid and the backup power, a schedule, or the like. In some embodiments, the control interface may be presented in response to a user selection of a particular user device. In some other embodiments, the control interface may present the one or more features for each device and/or application individually. In yet another embodiment, the control interface may present the one or more features associated with the one or more devices simultaneously.

Next, in block 1350, the process flow includes a user selection of at least one of the one or more features associated with the one or more devices. In some embodiments, the selection of the features may include assigning an authentication type to each of the selected features. As described herein, the different types of authentication may provide differing degrees of confidence regarding the authentication using such types. For example, if a username by itself used for a first user, authentication may be assigned to temperature regulation feature of a thermostat, and a username along with a password used for a second authentication may be assigned to programming schedule feature, then the second authentication should provide a higher confidence regarding the authentication because of the additional layer of authentication required. Further, within the types of authentication, varying levels of confidence may be used. For example, when using a password, a system may require users to create a password according to strict rules designed to increase the security level of the password, and therefore increase the confidence of any authentication using the password.

Next, as shown in block 1360, the process flow includes determining an optimum value for the one or more features. In this regard, the system may be configured to retrieve past information associated with the devices 50 and/or the applications 27, and determine an impact of the device on the user's target based on the retrieved information. For example, if the user's target is to be more energy efficient and save money on electricity bills, the system may be configured to retrieve information associated with one or more devices such as a thermostat, electrical sockets, smart sensors in house, or the like. In doing so, the system may retrieve usage information for each of the devices 50 to determine the impact of each device on the user's electricity bill. Having established the impact of each device on the user's target, the system may then determine an optimum value for each of the features selected by the user 4. In this regard, the system may be configured to implement one or more optimization algorithms and methods to determine an optimum value. In doing so, the system may be configured to enable the user 4 to achieve the target more efficiently and by using an optimum number of resources.

In response to determining an optimum value, the process flow includes modifying a value associated with the one or more selected features, as shown in block 1370. In doing so, the system may determine optimum values for each selected feature, thereby enabling the user to achieve the target efficiently. For example, if the device is a smart thermostat, the system may determine optimum values for the temperature based on user's schedule. In this way, if the values of the features are maintained at their optimum value, the user 4 may be able to achieve his/her target of saving on energy bills more efficiently. In some cases, the optimum value of the temperature may be different at different times of the day. In other cases, the optimum value of the temperature may be different at varying seasons. In this regard, the system may take into consideration the authentication types associated with each feature when modifying the value associated with the one or more selected features.

FIG. 14 illustrates one embodiment of using the aggregated data to improve the user's experience when utilizing various applications to reach the target. The aggregated data and the targets selected by the user 4 may be pushed to other systems or applications to act a filters to improve the output of the systems or applications. As illustrated by block 1410 in FIG. 14, the system receives an indication that a user 4 is accessing an application (e.g., an application alone, or an application tied to a device). For example, in one embodiment the user 4 may be accessing a search engine, a smart furnace application, a smart outlet application, or the like. Block 1420 illustrates that the system determines an action that the user 4 has taken, or is taking, within an application. The user 4 may be taking an action within the application, such as making a transaction, searching for information, controlling a device through an application, utilizing a reward through an application, or taking any other action through an application (e.g., stand-alone application or with respect to a device through an application). After determining the type of action being taken, the system provides the aggregated target information to the application (e.g., application alone, or device associated with the application) that is related to the application and/or action, as illustrated by block 1430 in FIG. 14. As such, the application being accessed by the user 4 may determine an output response to provide to the user 4 based on the action taken by the user 4, the aggregated target information, and the target information for individual applications (e.g., stand-alone applications 27 and/or applications 27 associated with a particular device 50).

In one example, the user 4 may be accessing a new a smart thermostat (e.g., second unit, as suggested the system, or the like). As such, in some embodiments the system may provide the thermostat application the specific temperature or temperature pattern at which to set the temperature based on a target previously selected by the user 4 and/or based on the aggregated information captured by the system from other applications (e.g., cost savings target, use of a previous smart thermostat, use of another smart thermostat, or the like). In response, the application associated with the smart thermostat may provide the suggested temperature or temperature pattern to the user 4 for confirmation.

In other examples, the user may be searching for energy saving products over the Internet in a search browser. In response, the system may provide the aggregated target information to the search browser to help refine the results of the search. For example, if the user is searching for energy related technologies, the aggregated target information and target information for individual applications and devices related to energy savings may be provided to the web browser in order refine the search for products that the user 4 may not already have.

In another example, the user 4 may be searching real estate websites. The system may provide target information related to savings, styles, budget (e.g., mortgage budget, or the like), or other like targets that the user 4 has. The system may provide this type of target information to the real estate website to pre-populate, filter, or otherwise provide more relevant real estate results to the user 4.

In another example, the user 4 may be searching for travel related information, and the system may provide travel, budget, style targets that the user has in order to pre-populate, filter, or otherwise provide more relevant travel results to the user 4.

In another example, the user 4 may be searching for health related information, and the system may provide the target information related to health (e.g., exercise information, food information, or the like) in order to pre-populate, filter, or otherwise provide more relevant health results to the user 4.

Block 1440 in FIG. 14 illustrates that the system may monitor the application in order to determine the output response provided by the application in which the user is taking the action. As illustrated in block 1450 the system may identify the output response and provide additional target suggestions based on the output response. For example, continuing with the energy savings related example, the search engine may present an application 27 or device 50 that may aid in reaching the target in which the user 4 is interested, such as battery storage device. In response, embodiments of the invention may analyze the battery storage device, and present target suggestions illustrating how the battery storage device may aid in reaching the target, thus helping the user 4 determine if the battery storage device may aid the user 4 in reaching the target.

As such, FIG. 14 illustrates that the user's own aggregated target information and/or target information for individual applications may supplement an output response provided by an application in response to a user action in order to provide more targeted output responses and/or in order to provide improved target suggestions to the user 4.

FIG. 15 illustrates a link application device detection and connection dashboard displayed on an interactive integrated interface according to embodiments of the invention. The dashboard may display the one or more devices 1502 and the one or more applications 1506 identified by the system, with alphanumeric, pictorial, audio or any other suitable elements. The system may display, either in the same dashboard or another dashboard, information associated with the one or more applications 27 and devices 50. For example, the system may display devices 1502 along with the associated applications 1504 either coupled to or configured to communicate with the devices 1502 and locations 1508 of the devices (for example, the user's home, workplace, the user's living room, GPS coordinates). For example, the system may determine a speaker device controlled by an application C. The locations 1508 of the devices may be fixed for stationary devices like air conditioning systems, alarm sensors, printers, stoves, refrigerators, or variable for devices like cars, wearable devices, cameras and the like. Similarly, the system may display applications 1506 along with the associated devices 1504 either coupled to or configured to be controlled by the applications 1506 and storage locations 1508 of the applications (for example, the tablet computer associated with the user 4, isolated memory location/a SIM or chip card of a mobile device, cloud storage and the like). The system may display one or more features 1510 associated with the applications 1506 and devices 1502. For example, the system may display representative audio/visual features associated with the devices and applications like icons, logos and other elements to enable the user to recognize the application/device. The interactive integrated interface may also enable the user provide/specify access permissions associated with the devices 1502 and the applications 1506. For example, the system may enable the system to access the user's location information from a wearable device identified by the system for a specified time period. As another example the user may enable the system to access transactions associated with a financial institution application, for example, a digital wallet, stored on the user device. In some embodiments, the system enables the user to choose the devices and applications that the user wishes to control/configure with the link application. If the user's chosen application is not stored on the user device with the link application, in some embodiments, the system may install at least a portion of the application on the user device. The system, at 1512 may also enable the user to specify additional devices or applications that the user wishes to control/configure with the link application.

The system may then determine one or more control factors of the one or more devices that may be modified. The control factors may be associated with features or functions of the one or more devices. Modifying the control factors may herein include, controlling, transmitting and/or monitoring the control factor. The system may also determine one or more associated applications that are configured to modify the control factors. For instance, the system may determine that for a heating device in the user's home, temperature settings (set temperature, current temperature), time settings and duration of operation, and power settings are control factors. The system may also identify one or more applications that are configured to receive the current temperature of the home/room from the device, that are configured to modify or set a desired temperature for the room and that are configured to turn the device on and off, for example by ceasing/starting power supply to the device from an outlet/socket. Continuing with the example, in addition to the direct control factors listed above, the system may determine indirect control factors for the device, for example, power requirements/power usage (for example, Watts), cost of utilizing the device, monthly budget of the user and the like. In this regard, the system may determine other associated applications, for example, a utility/service provider application configured to provide the power usage information associated with the device and a financial institution application to provide information about previous utility bill payments from a user account. If the associated application is not stored on the user device comprising the link application, in some embodiments, the system may automatically install at least a portion of the associated application on the user device, based on receiving authorization from the user. Although, the system may determine control factors of the devices that may be modified remotely, via one or more applications on the user device or the link application, the system may also determine, in some embodiments, one or more control factors that require in-person control. In this regard, the system may transmit reminders and notifications to the user or secondary users to modify the control factor.

FIG. 16 illustrates a link application interest determination dashboard displayed on an interactive integrated interface according to embodiments of the invention. The system may present the one or more determined interests 1602 and targets 1604 of the user along with visual representation of the interests and targets, or additional information 1606 on the dashboard. The interface may enable the user to choose one or more interests or targets for further analysis and also provide one or more new interests.

FIG. 17 illustrates a link application category configuration dashboard displayed on an interactive integrated interface according to embodiments of the invention. The system may display the one or more target categories 1702 and the associated targets 1706 on the interface. In some embodiments, the system may enable the user 4 to scroll through the categories and the related targets, for example, via action button 1704. The interface may further display additional information, audio/visual elements 1708 associated with the target 1706. The interface may enable the user 4 to choose a certain category and choose one or more targets associated with the category.

FIG. 18 illustrates a link application target configuration and device connectivity dashboard displayed on an interactive integrated interface according to embodiments of the invention. The link application target configuration and device connectivity dashboard 1800 may be referred to as a target interface or a control interface, elsewhere in the disclosure. The system may display the target card 1802 comprising a target identifier like a title, a picture or any other suitable means to enable the user to recognize the target. In some embodiments, the system may further display a target details, or proposed solutions 1804 comprising a brief description of the target, associated pictures, target attributes, history of previous activities associated with the target, related targets or the like. In some embodiments, the system may determine, one or more devices 1808 and one or more associated applications 1806, that when connected are configured to complete the target. In this regard, the system may determine one or more applications required to modify the control factors according to the desired target attributes. For example, the system may determine a target that the user 4 would save a certain amount on fuel by utilizing public transport or cycling to reach the user's workplace. The system may then determine that the applications associated with the user's wearable device for user location determination and fuel monitoring application associated with the user's car to be the applications 27 coupled to devices 50 related to the target. The system may further determine that a financial institution application associated with a user financial account is an associated application, with previous fuel payments being the control factors. The system may determine savings in fuel payments based on determining the trips of the user 4 to the workplace, via the wearable device and application and determining the reduction in fuel payments via the banking application. The system may also display control factors 1810 associated with device and the applications. In this regard, in some embodiments, the system may display one or more control factors that are required to be modified to achieve the target and one or more control features that do not aid in achieving the target. The user 4 may further have the ability to turn on/off the control factors that the user wants to use to control the applications 27 and/or devices 50, or that the user 4 wants the system to automatically control.

The system may then determine storage locations of the one or more related applications comprising memory locations on the user devices, cloud storage, databases associated with one or more entities and the like. The system may then establish data channels for communication between the user device and each of the one or more related applications locations. The system may then extract representative elements associated with each of the one or more related applications from the storage locations and display the representative elements associated with the one or more related applications on the interactive integrated interface 1800. For example, the systems may display representative visual/graphical element, audio features, textual element, associated with the devices and applications like application/entity names, icons, logos, characteristic sounds and other elements to enable the user 4 to recognize the application/device. In some embodiments, the system may extract or emulate at least a portion of functional features associated with the interfaces of the one or more applications and display them on the integrated interface, while maintaining their functionality. The system may then enable the user to modify or authorize modification of control factors, set target attributes, provide access permissions/authentication and the like 1812, in real time, for a plurality of applications and devices via the single interactive interface. The system may also determine the current values of target benefits and determine progress of current targets. For example, the target benefit value may be achieving movement of a first number of steps/miles on a particular day for a fitness target. The system may indicate to the user that the user has completed a second number of steps/miles at a certain heart rate and determine a percentage target progress, illustrated at 1814. The system may further display the status of the target at 1816. In this regard, the system may enable the user to create a new target, commence proposed target, start existing paused targets and display the statues of current targets like active, paused, complete and the like. The system may enable the user to configure the target as illustrated at 1818, by modifying one or more parameters described above.

FIG. 19 illustrates the link application target configuration and device connectivity dashboard displayed on the interactive integrated interface according to embodiments of the invention. Dashboard 1900 may be substantially similar to the target interface 1800 described above. However, the target interface 1900 illustrates a target configured to be completed by connecting/linking one or more applications. In this regard the FIG. 19, illustrates applications 1906 and 1908. For example, the target may be directed to obtaining savings on purchases. In this regard the system may determine a coupon application, a digital wallet application and a location determination application as the associated applications. The system may initiate electronic delivery of coupons based on determining the user's location within a particular store and/or automatically apply the coupons to the transactions via the digital wallet applications. In some embodiments, the location determination application may be coupled to the GPS device on the user device, for determining user location.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

INCORPORATION BY REFERENCE

To supplement the present disclosure, this application further incorporates entirely by reference the following commonly assigned patent applications:

| Docket Number | U.S. Patent Application Ser. No. | Title | Filed On |
|---|---|---|---|
| 014033-002539 | To be assigned | SYSTEM FOR DISCOVERY OF SOFTWARE OPERABLE ON A DEVICE | Concurrently herewith |
| 014033-002540 | To be assigned | SYSTEM FOR DISCOVERY OF DEVICES AND CONNECTIONS ASSOCIATED WITH A DEVICE | Concurrently herewith |
| 014033-002541 | To be assigned | SYSTEM FOR CONFIGURATION AND DEVICE CONNECTIVITY BASED ON USER SELECTION | Concurrently herewith |
| 014033-002542 | To be assigned | SYSTEM FOR CONFIGURATION, DEVICE CONNECTIVITY AND DEVICE CONTROL BASED ON USER SELECTION | Concurrently herewith |
| 014033-002544 | To be assigned | ACTIVE SELECTION CONFIGURATION SYSTEM WITH SUGGESTED ACTIONS | Concurrently herewith |
| 014033-002545 | To be assigned | APPLICATION CONNECTIVITY FOR AGGREGATION | Concurrently herewith |
| 014033-002546 | To be assigned | APPLICATION CONNECTIVITY FOR AGGREGATION AND FOR USE IN DATA FILTERING | Concurrently herewith |
| 014033-002547 | To be assigned | TARGET PRESENTMENT INTERFACE | Concurrently herewith |
| 014033-002548 | To be assigned | USER INTERFACE CUING | Concurrently herewith |

What is claimed is:

1. A system for active management of devices based on user selection, the system comprising:
   at least one non-transitory storage device;
   at least one processor; and
   at least one module stored in said storage device and comprising instruction code that is executable by the at least one processor and configured to cause said at least one processor to:
      establish a communication link with a user device, wherein the establishing further comprises establishing a data channel to access the user device;
      access the user device via the established data channel, wherein accessing further comprises determining a plurality of applications stored on the user device;
      determine a plurality of devices associated with the user device based at least in part on the plurality of applications;
      initiate, via the established communication link, a presentation of a target interface, wherein the target interface comprises one or more target categories and one or more targets associated with the one or more target categories determined based on at least the plurality of devices and the plurality of applications;
      receive, via the target interface, a user selection of a target category and a target associated with the target category;
      determine one or more additional devices and one or more additional applications associated with a user based on at least receiving the target, wherein the one or more additional devices and the one or more additional applications, when combined with the plurality of devices, aid the user to accomplish the target, wherein the one or more additional devices are not currently connected to the user device and the one or more additional applications are not currently stored on the user device, and wherein the one or more additional devices and the one or more additional applications have not been connected to the user device in the past;

initiate, via the established communication link, a control interface, wherein the control interface comprises one or more features associated with the plurality of devices;

receive, via the control interface, a user selection of at least one of the one or more features associated with the plurality of devices, thereby allowing one or more control factors associated with the one or more features to be modified;

determine an optimum value for the one or more selected features, wherein determining further comprises:

executing an optimization algorithm by varying one or more values of the one or more selected features relative to the selected target, wherein executing further comprises determining an impact value associated with the selected target, wherein the impact value indicates a maximum likelihood of the user accomplishing the target; and determining the optimum value for the one or more selected features based on at least the impact value, wherein applying the optimum value to the one or more selected features aids the user in accomplishing the selected target; and modify a value associated with the one or more selected features to reflect the optimum value.

2. The system of claim 1, wherein the plurality of devices are currently connected to a user device and/or the plurality of applications are currently stored on the user device.

3. The system of claim 1, wherein the plurality of devices and the plurality of applications have been connected to the user device in the past.

4. The system of claim 1, wherein the module is further configured to cause the at least one processor to:

initiate a presentation of an authentication interface in response to determining the plurality of devices associated with the user and the plurality of applications stored on the user device;

receive, via the authentication interface, one or more authentication credentials from the user;

validate the one or more authentication credentials; and access the plurality of devices associated with the user and the plurality of applications stored on the user device, wherein accessing further comprises modifying at least one control factor associated with the plurality of devices via the plurality of applications stored on the user device.

5. The system of claim 1, wherein the target category is associated with improving overall health.

6. The system of claim 5, wherein the one or more additional devices comprises at least a fitness activity tracker capable of monitoring a health of the user.

7. The system of claim 1, wherein the one or more additional applications are configured, via a link application, to be controlled from a central location.

8. A method for active management of devices based on user selection, the method comprising:

establishing, using a computing device processor, a communication link with a user device, wherein the establishing further comprises establishing a data channel to access the user device;

accessing, using a computing device processor, the user device via the established data channel, wherein accessing further comprises determining a plurality of applications stored on the user device;

determining, using a computing device processor, a plurality of devices associated with the user based at least in part on the plurality of applications;

initiating, via the established communication link, a presentation of a target interface, wherein the target interface comprises one or more target categories and one or more targets associated with the one or more target categories determined based on at least the plurality of devices and the plurality of applications;

receiving, via the target interface, a user selection of a target category and a target associated with the target category;

determining, using a computing device processor, one or more additional devices and one or more additional applications associated with a user based on at least receiving the target, wherein the one or more additional devices and the one or more additional applications, when combined with the plurality of devices, aid the user to accomplish the target, wherein the one or more additional devices are not currently connected to a user device and the one or more additional applications are not currently stored on the user device, and wherein the one or more additional devices and the one or more additional applications have not been connected to the user device in the past;

initiating, via the established communication link, a control interface, wherein the control interface comprises one or more features associated with the plurality of devices;

receiving, via the control interface, a user selection of at least one of the one or more features associated with the plurality of devices, thereby allowing one or more control factors associated with the one or more features to be modified;

determining, using a computing device processor, an optimum value for the one or more selected features, wherein determining further comprises:

executing an optimization algorithm by varying one or more values of the one or more selected features relative to the selected target, wherein executing further comprises determining an impact value associated with the selected target, wherein the impact value indicates a maximum likelihood of the user accomplishing the target; and determining the optimum value for the one or more selected features based on at least the impact value, wherein applying the optimum value to the one or more selected features aids the user in accomplishing the selected target; and modifying, using a computing device processor, a value associated with the one or more selected features to reflect the optimum value.

9. The method of claim 8, wherein the plurality of devices are currently connected to a user device and the plurality of applications are currently stored on the user device.

10. The method of claim 8, wherein the plurality of devices and the plurality of applications have been connected to the user device in the past.

11. The method of claim 8, wherein the method further comprises:
   initiating a presentation of an authentication interface in response to determining the plurality of devices associated with the user and the plurality of applications stored on the user device;
   receiving, via the authentication interface, one or more authentication credentials from the user;
   validating the one or more authentication credentials; and
   accessing the plurality of devices associated with the user and the plurality of applications stored on the user device, wherein accessing further comprises modifying at least one control factor associated with the plurality of devices via the plurality of applications stored on the user device.

12. The method of claim 9, wherein the target category is associated with improving overall health.

13. The method of claim 12, wherein the one or more additional devices comprises at least a fitness activity tracker capable of monitoring a health of the user.

14. The method of claim 9, wherein the one or more additional applications are configured, via a link application, to be controlled from a central location.

15. A computer program product for active management of devices based on user selection, the computer program product comprising a non-transitory computer-readable medium comprising code causing a first apparatus to:
   establish a communication link with a user device, wherein the establishing further comprises establishing a data channel to access the user device;
   access the user device via the established data channel, wherein accessing further comprises determining a plurality of applications stored on the user device;
   determine a plurality of devices associated with the user based at least in part on the plurality of applications;
   initiate, via the established communication link, a presentation of a target interface, wherein the target interface comprises one or more target categories and one or more targets associated with the one or more target categories determined based on at least the plurality of devices and the plurality of applications;
   receive, via the target interface, a user selection of a target category and a target associated with the target category;
   determine one or more additional devices and one or more additional applications associated with a user based on at least receiving the target, wherein the one or more additional devices and the one or more additional applications, when combined with the plurality of devices, aid the user to accomplish the target, wherein the one or more additional devices are not currently connected to a user device and the one or more additional applications are not currently stored on the user device, and wherein the one or more additional devices and the one or more additional applications have not been connected to the user device in the past;
   initiate, via the established communication link, a control interface, wherein the control interface comprises one or more features associated with the plurality of devices;
   receive, via the control interface, a user selection of at least one of the one or more features associated with the plurality of devices, thereby allowing one or more control factors associated with the one or more features to be modified;
   determine an optimum value for the one or more selected features, wherein determining further comprises:
      executing an optimization algorithm by varying one or more values of the one or more selected features relative to the selected target, wherein executing further comprises determining an impact value associated with the selected target, wherein the impact value indicates a maximum likelihood of the user accomplishing the target; and
      determining the optimum value for the one or more selected features based on at least the impact value, wherein applying the optimum value to the one or more selected features aids the user in accomplishing the selected target; and
   modify a value associated with the one or more selected features to reflect the optimum value.

16. The computer program product of claim 15, wherein the plurality of devices are currently connected to a user device and the plurality of applications are currently stored on the user device.

17. The computer program product of claim 15, wherein the plurality of devices and the plurality of applications have been connected to the user device in the past.

18. The computer program product of claim 15, wherein the first apparatus is further configured to:
   initiate a presentation of an authentication interface in response to determining the plurality of devices associated with the user and the plurality of applications stored on the user device;
   receive, via the authentication interface, one or more authentication credentials from the user;
   validate the one or more authentication credentials; and
   access the plurality of devices associated with the user and the plurality of applications stored on the user device, wherein accessing further comprises modifying at least one control factor associated with the plurality of devices via the plurality of applications stored on the user device.

19. The computer program product of claim 15, wherein the first apparatus is further configured to determine one or more additional devices and one or more additional applications associated with the user based on at least determining that the one or more additional devices when combined with the plurality of devices aids the user to accomplish the target.

20. The computer program product of claim 19, wherein the one or more additional devices are not currently connected to a user device and the one or more additional applications are not currently stored on the user device.

* * * * *